United States Patent Office 3,646,049
Patented Feb. 29, 1972

3,646,049
ACYLAMINOBENZIMIDAZOLE DERIVATIVES
Dale R. Hoff, Basking Ridge, and Michael H. Fisher, Bridgewater Township, Somerville County, N.J., assignors to Merck & Co., Inc., Rahway, N.J.
No Drawing. Continuation-in-part of application Ser. No. 696,496, Jan. 9, 1968, which is a continuation-in-part of application Ser. No. 631,746, Feb. 3, 1967. This application Mar. 5, 1970, Ser. No. 16,957
Int. Cl. C07d 49/38
U.S. Cl. 260—302 H
18 Claims

ABSTRACT OF THE DISCLOSURE

Benzimidazoles having a heteroaryl substituent in the 2-position and a substituted amino radical at the 5- or the 6-position are prepared by variety of techniques including reaction of the corresponding 5-amino or 6-amino benzimidazole with the appropriate acyl halide or haloformate. These benzimidazoles are new compounds having significant anthelmintic activity. Benzimidazoles having the above-stated substituents at the 2- and 5- or 6-positions and further substituted at the 1-position with alkyl, aralkyl, hydroxy, acyl, carboxyalkoxy, carbamoyl, alkoxycarbonyl, alkenyloxy, or alkoxy, including substituted alkoxy, radicals are provided. The preferable substituent in the 1-position is an alkoxy which can be substituted by a large number of radicals.

CROSS REFERENCES TO RELATED APPLICATIONS

This application is a continuation-in-part of U.S. Ser. No. 696,496, filed Jan. 9, 1968, now abandoned, the latter application being a continuation-in-part of U.S. Ser. No. 613,746, filed Feb. 3, 1967, now abandoned.

FIELD OF THE INVENTION

The present invention pertains to benzimidazoles having a heteroaryl radical at the 2-position and a substituted amino radical at the 5- or the 6-position. The 5-substituent is of the carbamate, thionocarbamate, carbonylamino or thiocarbonylamino type. The invention also relates to processes for making such compounds as well as to anthelmintic compositions containing them as the essential active ingredients.

DESCRIPTION OF THE PRIOR ART

Benzimidazoles having a heteroaryl radical in the 2-position have been described in the prior art as anthelmintic agents. U.S. Pat. No. 3,017,415 is illustrative of this prior art. Certain 2-heteroaryl-5-amino-benzimidazoles have likewise been described and claimed in the patent literature, such as, for instance, in Belgian Pat. No. 655,925, issued May 18, 1965. Although these materials are active anthelmintic agents, the search has continued for substances which are more potent and which are effective against helminths that are non-responsive or weakly responsive to the prior art compounds. In accordance with the present invention, there are provided a group of highly active and broad spectrum anthelmintics.

SUMMARY

An object of this invention is to provide a group of novel benzimidazoles. A further object is provision of methods for synthesizing such compounds, and a still further object is the provision of anthelmintically active compositions that comprise one or more of the compounds of the invention intimately dispersed in a suitable carrier vehicle. More specifically, the invention provides a group of 5-substituted amino or 6-substituted amino benzimidazoles having a heteroaryl radical at the 2-position. These materials are further substituted in the 1-position. Also provided by the invention are nontoxic acid addition salts and heavy metal complexes of said benzimidazoles. It has been found according to this invention that the substituted amino substituent at the 5- or 6-position of the benzimidazole nucleus imparts, in many cases, a surprisingly high degree of anthelmintic activity as compared with the correspondingly unsubstituted compound which was not predictable or anticipated from the teachings of the prior art. The compounds of this invention, which are described in great detail herein below, are used to treat helminthiasis in the form of orally administrable drenches, boluses, capsules, or in animals feeds. They may also be administered to the infected host via intramuscular, intraruminal or intratracheal injection. In addition to their high degree of anthelmintic activity, the novel benzimidazoles of this invention also posses significant antifungal activity, and they are also active against trichinosis.

DESCRIPTION OF THE INVENTION

The novel benzimidazoles provided in accordance with the present invention are those having the following structural formulae:

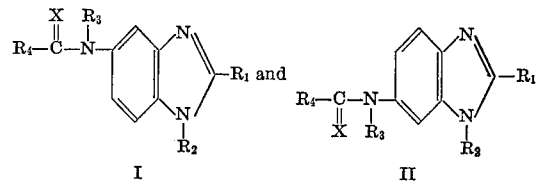

I  II

In both the above formulae, the symbol $R_1$ represents a five-membered monocyclic heteroaromatic ring containing from 1 to 3 hetero atoms selected from the group consisting of oxygen, sulfur and nitrogen. The symbol $R_3$ in the above formulae represents hydrogen or a straight or branched chain loweralkyl group containing from 1 to 8 carbon atoms such as, for example, methyl, ethyl, propyl, isopropyl, amyl, hexyl, n-octyl and the like. The symbol X in the above formulae represents oxygen and sulfur.

The symbol $R_4$ in the foregoing formulae I and II represents a loweralkoxy, loweralkylthio, aryloxy, arylthio, heteroaryloxy, or a heteroarylthio radical, in which case the 5-substituent on the benzimidazole is of the carbamate or thionocarbamate type depending upon the nature of the X substituent. The symbol $R_4$ may also represent hydrogen, loweralkyl, cycloalkyl, aryl, aralkyl, heteroaryl, monoloweralkylamino, diloweralkylamino or cycloalkylamino, in which event the substituent at the 5-position of the benzimidazole is of the carbonylamino or thiocarbonylamino type depending upon the nature of the X substituent.

$R_2$ in the foregoing formulae represents hydrogen, loweralkyl, aralkyl, acyl, carbamoyl, alkoxycarbonyl, hydroxy, loweralkoxy, loweralkenyloxy, carboxyloweralkoxy and loweralkyl esters thereof, aminoloweralkoxy containing from 2 to 6 carbon atoms in the alkoxy moiety and the N-loweralkyl, N,N-diloweralkyl and triloweralkylammonium halide derivatives thereof, phosphonoloweralkoxy and loweralkyl esters thereof, phosphatoloweralkoxy and loweralkyl esters thereof, loweralkylthioloweralkoxy and the sulfoxide and sulfone derivatives thereof, sulfoloweralkoxy, C-amidinoloweralkoxy and $N_1$- and $N_2$-loweralkyl derivatives thereof, N-amidinoloweralkoxy wherein the amidino moiety is derived from a loweralkanoic acid and the N-loweralkyl derivatives thereof, biguanidoloweralkoxy, guanidinoloweralkoxy and the $N_1$, $N_2$, and $N_3$ loweralkyl derivatives thereof, aminoguanidinoloweralkoxy and the N', $N_1$, $N_2$, and $N_3$ loweralkyl derivatives thereof, imidazolinylaminoloweralkoxy and the 1-loweralkyl derivatives thereof, 1,4,5,6-tetrahydropyrimidinylaminoloweralkoxy and the 1-loweralkyl derivatives thereof, thiazolinylaminoloweralkoxy, thiazinylaminoloweralkoxy, imidazolinoloweralkoxy and the 1-loweralkyl derivatives thereof, 1,4,5,6-tetrahydropyrimidinoloweralkoxy and the 1-loweralkyl derivatives thereof, loweralkanoyloxy, α-aminocarboxyloweralkoxy, glycosyloxy, p-loweralkylphenacyloxy and p-loweralkoxyphenacyloxy; and non-toxic alkali metal, alkaline earth metal and pharmaceutically acceptable amine salts and heavy metal complexes thereof when $R_2$ is carboxyloweralkoxy, sulfoloweralkoxy, phosphonoloweralkoxy, phosphatoloweralkoxy; or α-aminocarboxyloweralkoxy; and salts thereof with pharmaceutically acceptable acids when $R_2$ is aminoloweralkoxy, C-amidinoloweralkoxy, N-amidinoloweralkoxy, biguanidoloweralkoxy, guanidinoloweralkoxy, aminoguanidinoloweralkoxy, imidazolinylaminoloweralkoxy, tetrahydropyrimidinylaminoloweralkoxy, thiazolinylaminoloweralkoxy, thiazinylaminoloweralkoxy, imidazolinoloweralkoxy, tetrahydropyrimidinoloweralkoxy or α-aminocarboxyloweralkoxy; or whenever the $R_2$ group contains a free hydrogen.

As used above, the terms loweralkyl, loweralkoxy and loweralkanoyloxy are intended to include both straight and branched chain loweralkyl, lower alkoxy and loweralkanoyloxy groups containing, unless otherwise specified, from 1 to 8 carbon atoms in the alkyl, alkoxy, or alkanoyloxy moiety. Typical of such loweralkyl, loweralkoxy and loweralkanoyloxy groups are, for example, methyl, ethyl, propyl, isopropyl, n-butyl, amyl, n-hexyl, methoxy, ethoxy, propoxy, n-octyloxy, formyloxy, acetyloxy, propionyloxy, isobutyryloxy and n-hexanoyloxy. The term, loweralkenyloxy, is intended to include both straight and branched chain loweralkenyloxy groups containing from 2 to 8 carbon atoms in the alkenyloxy moiety such as, for example, vinyloxy, allyloxy, propenyloxy, crotyloxy, isobutenyloxy and octenyloxy. The triloweralkylammonium halide derivatives of the 1-aminoloweralkoxy substituted benzimidazoles described above will include the fluoride, chloride, bromide and iodide quaternary salts. The terms, alkali metal salt and alkaline earth metal salt, are intended to include salts of alkali and alkaline earth metals such as for example, lithium, sodium, potassium, cesium, calcium, magnesium, barium and strontium. Pharmaceutically acceptable amine salts will include those derived from amines such as, for example, ammonia, ethanolamine, diethanolamine, guanidine, arginine, lysine, ethylenediamine, piperazine and morpholine. Typical pharmaceutically acceptable acid salts will include those derived from inorganic and organic acids such as hydrochloric acid, sulfuric acid, phosphoric acid, acetic acid, valeric acid, lactic acid, caproic acid, aspartic, glutamic acid, citric acid, and tartaric acid.

Specific examples of the heteroaromatic substituents represented by $R_1$ in Formula I are five-membered rings containing nitrogen, sulfur or oxygen as the sole hetero atom, i.e., furyl, thienyl, pyrazolyl, imidazolyl and pyrryl; five-membered rings containing nitrogen and sulfur such as thiazolyl, thiadiazolyl, and isothiazolyl rings; and five-membered rings containing nitrogen and oxygen such as oxazolyl. The nitrogen and sulfur containing heterocycles are the preferred substituents with 4'-thiazolyl and 2'-thiazolyl being particularly desirable.

The substituent present at the 5-position or the 6-position of the benzimidazole is an important point of this invention. Specific examples of suitable substituents include those wherein $R_4$ is a straight or branched chain, saturated or unsaturated, loweralkoxy or halo loweralkoxy radical having from 1 to 8 carbon atoms such as methoxy, ethoxy, isopropoxy, allyloxy, propenyloxy, 2,2,2-trifluoroethoxy, amyloxy, n-octyloxy and the like; those wherein $R_4$ is a straight or branched chain, saturated or unsaturated, loweralkylthio or halo loweralkylthio radical having from 1 to 8 carbon atoms such as methylthio, ethylthio, 2-chloroethylthio, isopropylthio, allylthio, n-hexylthio and the like; those wherein $R_4$ is aryloxy such as phenoxy, halophenoxy, aminophenoxy, tolyloxy, naphthyloxy and the like; those wherein $R_4$ is arylthio such as phenylthio, halophenylthio, aminophenylthio, tolylthio, naphthylthio and the like; those wherein $R_4$ is heteroaryloxy such as furyloxy, thiozolyloxy, thienyloxy, pyrazinyloxy and the like; and those wherein $R_4$ is heteroarylthio such as furylthio, thiazolylthio, thienylthio, pyrazinylthio and the like. As noted above, substituents of the foregoing type will afford carbamates or thionocarbamate at the 5- or 6-position.

The preferred substituents at $R_4$ are those which are phenyl, p-fluorophenyl, or loweralkoxy having 1 to 8 carbon atoms, and the particular embodiments which are specifically preferred are methoxy, ethoxy, or isopropoxy. When this $R_4$ is employed with the most preferred X, i.e., when X is oxygen, the particular isopropoxy carbonylamino or loweralkoxy carbonylamino is produced. The latter are the most preferred substituents at the 5- or 6-position of the benzimidazole.

Further specific illustrations of suitable substituents at the 5- or 6-position include those wherein $R_4$ is a straight or branched chain, saturated or unsaturated, loweralkyl or halolower alkyl radical having from 1 to 8 carbon atoms such as methyl, dichloromethyl, ethyl, isopropyl, allyl, t-butyl, amyl, octyl and the like; those wherein $R_4$ is cycloalkyl such as cyclopropyl, cyclopentyl, cyclohexyl, adamantyl and the like; those wherein $R_4$ is aryl such as phenyl, halophenyl, aminophenyl, tolyl, naphthyl and the like; those wherein $R_4$ is aralkyl such as benzyl, halobenzyl, phenethyl and the like; heteroaryl such as furyl, thiazolyl, thienyl, pyridyl, and the like; those wherein $R_4$ is a straight or branched chain mono- or diloweralkylamino radical having from 1 to 8 carbon atoms in the alkyl moiety such as methylamino, diethylamino, isopropylamino, methylethylamino, n-hexylamino and the like; and those wherein $R_4$ is cycloalkylamino such as piperazino, piperidino, morpholino, pyrrolidino and the like. These substituents, as noted above, will afford carbonylamino or thiocarbonylamino groups at the 5-position.

In one preferred embodiment of the invention, $R_2$ represents hydrogen. It will be obvious to one skilled in the art that when the nitrogen atom at position-1 is unsubstituted, the benzimidazoles of Formulae I and II are identical, since the correct nomenclature would be, for instance, 5(6) - isopropoxy-carbonylamino - 2 - (4'-thiazolyl)-benzimidazole. The number 5(6) indicates that the benzimidazole ring can be numbered starting with either nitrogen as 1.

However, the 1-position of the benzimidazole can also be substituted. Once position-1 is substituted, the final benzimidazole having a substitution at either position-5 or position-6 can be prepared. The $R_2$ group has already been defined above. One preferred sub-group of $R_2$ can represent loweralkyl having 1 to 8 carbon atoms, aralkyl such as benzyl, acyl, such as loweralkanoyl having 1 to 8 carbon atoms, loweralkanoyloxy having 1–8 carbon atoms, loweralkoxycarbonyl such as methoxycarbonyl, ethoxycarbonyl, or isopropoxycarbonyl, carbamoyl and N-loweralkylcarbamoyl such as N-methylcarbamoyl, N-ethylcarbamoyl, or N-butylcarbamoyl. This particular sub-group includes $R_2$ substituents which do not contain an oxygen linked directly to the position-1 nitrogen atom.

The more preferred $R_2$ substituents, however, do contain an oxygen linked directly to the position-1 nitrogen atom, and most can be described generically as either ethers or esters.

This more preferred group includes hydroxy, loweralkoxy, loweralkenyloxy, carboxyloweralkoxy, and loweralkyl esters thereof, aminoloweralkoxy containing from 2 to 6 carbon atoms in the alkoxy moiety and the N-loweralkyl, N,N-diloweralkyl and triloweralkylammonium halide derivatives thereof, phosphonoloweralkoxy and loweralkyl esters thereof, phosphatoloweralkoxy and loweralkyl esters thereof, loweralkylthioloweralkoxy and the sulfoxide and sulfone derivatives thereof, sulfoloweralkoxy, C-amidinoloweralkoxy and $N_1$- and $N_2$-loweralkyl derivatives thereof, N-amidinoloweralkoxy wherein the amidino moiety is derived from a loweralkanoic acid and the N-loweralkyl derivatives thereof, biguanidoloweralkoxy, guanidinoloweralkoxy, and the $N_1$, $N_2$, and $N_3$ loweralkyl derivatives thereof, aminoguanidinoloweralkoxy and the N′, $N_1$, $N_2$, and $N_3$ loweralkyl derivatives thereof, imidazolinylaminoloweralkoxy and the 1-loweralkyl derivatives thereof, 1,4,5,6-tetrahydropyrimidinylaminoloweralkoxy and the 1-loweralkyl derivatives thereof, thiazolinylaminoloweralkoxy, thazinylaminoloweralkoxy, imidazolinoloweralkoxy and the 1-loweralkyl derivatives thereof, 1,4,5,6-tetrahydropyrimidinoloweralkoxy and the 1-loweralkyl derivatives thereof, loweralkanoyloxy, α-aminocarboxyloweralkoxy, glycosyloxy, p-loweralkylphenacyloxy and p-loweralkoxyphenacyloxy; and non-toxic and alkali metal alkaline earth metal and pharmaceutically acceptable amine salts and heavy metal complexes thereof when $R_2$ is carboxyloweralkoxy, sulfoloweralkoxy, phosphonoloweralkoxy, phosphatoloweralkoxy; or α-aminocarboxyloweralkoxy; and salts thereof with pharmaceutically acceptable acids when $R_2$ is aminoloweralkoxy, C-amidinoloweralkoxy, N-amidinoloweralkoxy, biguanidoloweralkoxy, guanidinoloweralkoxy, aminoguanidinoloweralkoxy, imidazolinylaminoloweralkoxy, tetrahydropyrimidinylaminoloweralkoxy, thiazolinylaminoloweralkoxy, thiazinylaminoloweralkoxy, imidazolinoloweralkoxy, tetrahydropyrimidinoloweralkoxy or α-aminocarboxyloweralkoxy; or whenever the $R_2$ group contains a free hydrogen.

The most preferred $R_2$ substituents which contain an oxygen linked directly to the nitrogen are phosphonoloweralkoxy, phosphatoloweralkoxy, sulfoloweralkoxy, C-amidinoloweralkoxy, N-amidinoloweralkoxy (wherein the amidino moiety is derived from a loweralkanoic acid) biguanidoloweralkoxy, guanidinoloweralkoxy, aminoguanidinoloweralkoxy, imidazolinylaminoloweralkoxy; 1,4,5,6-tetrahydropyrimidinylaminoloweralkoxy, thiazolinylaminoloweralkoxy; 1,4,5,6-tetrahydropyrimidinoloweralkoxy, α-aminocarboxyloweralkoxy, and glycosyloxy. These substituents can also be employed as the loweralkyl esters thereof if desired.

The optimally preferred $R_2$ substituents containing an oxygen linked directly to the nitrogen are carboxyalkoxy, especially carboxymethoxy; aminoalkoxy, including N-alkyl and N,N-dialkyl-substituted aminoalkoxy, such as aminoethoxy, dimethylaminoethoxy, or ethylaminopropoxy; diaminoalkoxy, such as 3,3-diaminopropoxy; phosphonoloweralkoxy, such as phosphonoethoxy; sulfoloweralkoxy, such as sulfoethyl; C-amidinoalkoxy, N-amidinoalkoxy, or guanidinoloweralkoxy, such as guanidinoethoxy.

A careful reading of the above will result in the conclusion that the benzimidazole compounds described as follows are those which are the most important contribution of this invention. The formulae of these compounds are:

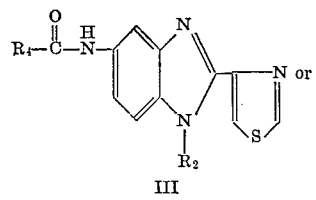

III

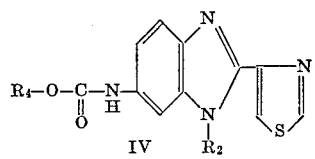

IV wherein $R_4$ is loweralkoxy having 1 to 8 carbon atoms, especially methoxy, ethoxy, or isopropoxy; and $R_2$ is carboxyalkoxy, especially carboxymethoxy; sulfoloweralkoxy, especially 2-sulfoethoxy; guanidinoloweralkoxy, especially guanidinoethoxy; phosphonoloweralkoxy, especially phosphonoethoxy; aminoloweralkoxy, especially aminoethoxy, N,N-dimethylaminoethoxy, or 3,3-diamino-n-propoxy; C-amidinoloweralkoxy, or N-amidinoloweralkoxy.

In those cases where there is a free hydrogen on the $R_2$ substituent, there may be formed acid addition salts with acids such as hydrochloric, sulfuric, nitric, phosphoric and hypophosphorous acid; with organic acids such as acetic, tertiarybutylacetic, dialkylphosphoric, citric, benzoic, lactic and oxalic acid. Certain of these salts are more soluble than the parent base and for this reason are preferred when a soluble form of product is desired for anthelmintic or antifungal use. This invention also contemplates the heavy metal complexes of the disclosed benzimidazoles which are obtained by reacting the benzimidazole (where $R_2$ contains a free hydrogen) with a salt of a heavy metal such as copper, lead, mercury, and iron.

The novel benzimidazoles of this invention wherein the substituent at the 5-position is of the carbamate type are readily prepared by reacting a 5-amino-2-$R_1$-benzimidazole with an R-haloformate or halothioformate where R is the hydrocarbon moiety derived from $R_4$ as defined above. When an R-haloformate is employed as a reactant, the resultant substituent at the 5-position of the benzimidazole will have the characteristic structure, R—O—CO—NH—. For convenience, such substituents may be referred to generically as hydrocarbonoxy-carbonylamino radicals. When an R-halothioformate is employed as a reactant, the resultant substituent at the 5-position will have the characteristic structure, R—S—CO—NH—. For convenience, these substituents may be referred to generically as hydrocarbonthiol-carbonylamino radicals.

The above reaction is preferably carried out using the appropriate chloroformate or chlorothioformate. It is conveniently conducted at temperatures of from about 20–50° C. in an organic solvent and in the presence of an acid binding agent. It has been found very convenient to conduct the reaction in a solvent such as pyridine which also serves as acid binding agent, although other basic solvents such as the picolines and lutidines could be used equally well. Neutral solvents, however, can be employed in which case the product is isolated as the acid addition salt. The resulting carbamate is water insoluble and is conveniently precipitated by diluting the reaction mixture with a relatively large volume of water. The solid is then recovered by standard methods and purified by recrystallization from solvents such as methanol, ethanol, acetonitrile or mixtures thereof. When a lower alkanol is used as the recrystallization solvent, there is a tendency on the part of some of our compounds, especially those wherein the radical $R_4$ is of lower molecular weight, to crystallize as an alcohol solvate. When this occurs, the free compound may be obtained by drying of the solvate under vacuum at temperatures of from about 60–90° C.

Representative of the compounds within the scope of our invention and prepared by the above-described procedure are 5-methoxycarbonylamino-2-(4′-thiazolyl)benzimidazole,
5-ethoxycarbonylamino-2-(2′-thiazolyl)benzimidazole,
5-methylthiocarbonylamino-2-(2′-furyl)benzimidazole,
5-ethylthiolcarbonylamino-2-(3′-thienyl)benzimidazole,
5-p-fluorophenoxycarbonylamino-2-(4′-thiazolyl)benzimidazole,
5-benzyloxycarbonylamino-2-(4′-thiazolyl)benzimidazole,
5-cyclopropyloxycarbonylamino-2-(4′-thiazolyl)benzimidazole,
5-thiazolyloxycarbonylamino-2-(4′-thiazolyl)benzimidazole,
5-phenylthiocarbonylamino-2-(4′-oxazolyl)benzimidazole, and
5-phenoxycarbonylamino-2-(4′-pyrryl)benzimidazole.

It has been found also that the hydrocarbonoxycarbonylamino embodiments of this invention may be prepared directly from the hydrocarbonthiol-carbonylamino embodiments by treating the latter in the presence of a weakly basic catalyst such as dibutyltinoxide and aluminum isopropoxide with the alcohol corresponding to the desired $R_4$ function. Through this ester exchange technique, for example, 5-cyclopropoxycarbonylamino-2-(4'-thiazolyl)benzimidazole may be prepared by treating the corresponding 5-ethylthiolcarbonylamino compound with cyclopropanol in the presence of dibutyltinoxide; 5- phenoxycarbonylamino-2-(4'-thiazolyl)benzimidazole may be prepared by treating the corresponding 5-methylthiolcarbonylamino compound with phenol in the presence of aluminum isopropoxide; and 5-benzylcarbonylamino-2-(4'-thiazolyl)benzimidazole may be prepared by treating the corresponding 5-phenylthiolcarbonylamino compound with benzyl alcohol in the presence of dibutyltinoxide. While any of the 5-hydrocarbonthio-carbonylamino embodiments of this invention may be employed as starting material for the ester exchange, it is preferred to employ a loweralkylthiol-carbonylamino compound such as 5-methyl-1-(or ethyl)thiocarbonylamino - 2 - (4'-thiazolyl) benzimidazole.

The reaction is carried out by refluxing the 5-hydrocarbonthiol-carbonylamino benzimidazole in the selected alcohol in the presence of a catalytic quantity of the weak base. Reaction is usually complete in about 10 to about 24 hours after which the 5-hydrocarbonoxy-carbonylamino benzimidazole is recovered by evaporation of the solvent. The residue is purified by conventional recrystallization techniques.

The compounds of this invention having a carbonylamino radical at the 5-position are also obtained from a 5-amino-2-$R_1$-benzimidazole by reacting the benzimidazole with the appropriate acyl halide or an acid anhydride. It has been found convenient to employ an acyl chloride as the reactant and carry out the process in an organic solvent such as pyridine, a picoline or a lutidine, which will then also serve as an acid binding agent. The resulting 5-carbonylamino benzimidazoles are only slightly soluble in water and are conveniently recovered by the same method described above for recovering the carbamates. Representative examples of novel benzimidazoles obtained in this fashion are 5-acetylamino-2-(4'-thiazolyl)benzimidazole,
5-(p-fluorobenzoyl)amino-2-(2'-thiazolyl)
benzimidazole,
5-formylamino-2-(3'-thienyl)benzimidazole,
5-phenylacetylamino-2-(2'-oxazolyl)benzimidazole,
5-benzoylamino-2-(4'-thiazolyl)benzimidazole and
5-propionoylamino-2-(4'-thiazolyl)benzimidazole.

The novel benzimidazoles of this invention wherein the substituent at the 5-position is of the thionocarbamate type may be prepared by a variety of methods from starting materials either well known or readily obtainable by the techniques hereinafter described. The thionocarbamate substituent at the 5-position will have the characteristic structure R—O—CS—NH— or

where R is the hydrocarbon moiety derived from $R_4$ as defined above. For convenience, thionocarbamates of the structure R—O—CS—NH— may be referred to generally as hydrocarbonoxy-thiocarbonylamino compounds and thionocarbamates having the structure

may be referred to generically as hydrocarbonthiol-thiocarbonylamino compounds.

The 5-hydrocarbonoxy-thiocarbonylamino benzimidazoles of this invention are readily prepared by treating a 5-amino-2-$R_1$-benzimidazole with the appropriate alkoxy, aryloxy, or heteroaryloxy thiocarbonyl halide, preferably the thiocarbonyl chloride. The reaction conveniently is carried out by adding the thiocarbonyl halide at room temperature to a stirred suspension of the amino benzimidazole in a suitable organic solvent such as pyridine. Reaction is usually complete in from 1 to 3 hours after which the product may be precipitated from the reaction mixture by the addition of water. The product is recovered by filtration and purified by conventional recrystallization techniques.

Applicants have found that the 5-hydrocarbonoxy-thiocarbonylamino benzimidazoles of this invention (and particularly a 5-phenoxythiocarbonylamino benzimidazole) when dissolved in pyridine and heated at about 100° C. for 1 to 4 hours, are converted into the corresponding 5-isothiocyanato benzimidazole which compound is a valuable intermediate in the preparation of many of the novel benzimidazoles of this invention. It has been found, for example, that the 5-hydrocarbonoxy-thiocarbonylamino benzimidazoles themselves are readily prepared by reacting a 5-isothiocyanato benzimidazole with an alcohol. Thus, 5-methoxythiocarbonylamino-2-(4'-thiazolyl)benzimidazole may be prepared by treating 5-isothiocyanato-2-(4'-thiazolyl)benzimidazole with methanol. Other 5-hydrocarbonyloxy-thiocarbonylamino substituents may be added merely by employing an appropriate alcohol.

The 5-hydrocarbonthiol-thiocarbonylamino benzimidazoles of this invention may be prepared by reacting a 5-isothiocyanato benzimidazole with a mercaptan. The reaction is carried out by reacting the 5-isothiocyanato benzimidazole in a suitable organic solvent at room temperature with the mercaptan. Reaction is usually complete in from about 10 to about 24 hours after which the product is precipitated from the reaction mixture by the addition of water. The product is recovered by filtration, purified by conventional recrystallization techniques. Thus, for example, 5-methylthiolthiocarbonylamino-2-(4'-thiazolyl)benzimidazole is prepared by treating 5-isocyanato - 2 - (4'-thiazolyl)benzimidazole with methyl mercaptan. To prepare the other 5-hydrocarbonthiol-thiocarbonylamino benzimidazoles of this invention, it is merely necessary to select the appropriate mercaptan.

The 5-thiocarbonylamino benzimidazoles of this invention are readily prepared from the corresponding 5-carbonylamino benzimidazoles by treating the 5-carbonylamino benzimidazole at reflux in a suitable organic solvent such as pyridine with phosphorous pentasulfide. Upon completion of the reaction, which usually requires about 20 to about 40 minutes, the reaction mixture is poured onto ice and the product which separates is recovered by filtration and purified by conventional techniques.

The 5 carbonylamino benzimidazoles of this invention wherein $R_4$ is a monoloweralkylamino radical may be prepared by treating a 5-amino-2-$R_1$ benzimidazole at room temperature in a suitable organic solvent such as pyridine with a lower alkyl isocyanate. Reaction is usually complete in about 2 to 4 hours after which the product is precipitated from the reaction mixture by the addition of water and is recovered by filtration. Purification is achieved by conventional recrystallization techniques.

5 - diloweralkylamino-carbonylamino benzimidazoles can be prepared by reacting a 5-amino-2-$R_1$ benzimidazole at room temperature in an organic solvent such as pyridine with a diloweralkylcarbamoyl halide, preferably the carbamoyl chloride. The reaction is usually complete in about 1 to 3 hours after which the product is recovered and purified by the techniques previously described.

Alternatively, 5 - diloweralkylamino - carbonylamino benzimidazoles can be prepared from a corresponding 5-alkylthiolcarbonylamino benzimidazole by refluxing a mixture of the 5-alkylthiolcarbonylamino benzimidazole and a diloweralkylamine. After refluxing for about 1 to 2 hours, the reaction mixture is evaporated and water is added to precipitate the product which is recovered and purified by conventional techniques. This reaction also may be used to prepare 5-cycloalkylamino-carbonylamino benzimidazoles in which case a cycloalkylamine is used instead of the diloweralkyl amine.

The 5-thiocarbonylamino benzimidazoles of this invention wherein $R_4$ is a monoloweralkylamino radical may be prepared by reacting a 5-amino-2-$R_1$ benzimidazole at room temperature in an organic solvent such as pyridine with a loweralkyl isothiocyanate. The reaction usually requires about 1 to 3 hours for completion. The product is precipitated from the reaction mixture by adding water and is recovered by filtration and purified by conventional recrystallization techniques.

5-diloweralkylamino-thiocarbonylamino and cycloalkyl-amino-thiocarbonylamino benzimidazoles may be prepared by reacting a 5-isothiocyanato benzimidazole with a diloweralkylamine or a cycloalkylamine. The reaction may be carried out in the presence of water or an alcoholic solvent. Although the reaction will proceed at room temperature, it may also be carried out at reflux temperatures. The reaction is usually complete in about 1 to 6 hours after which the solid product, if not already separated from the reaction mixture, may be precipitated by the addition of water. The crude product is recovered and purified by conventional techniques.

The above discussion of the preparation of 5-substituted benzimidazoles relates to compounds which are unsubstituted at the position-1 nitrogen atom. When compounds having a substituent at 1 are desired, different procedures are employed.

The 1-substituted benzimidazoles of this invention where $R_2$ is loweralkyl, aralkyl and acyl are normally prepared from the parent benzimidazoles by techniques well known in the art (see, for example, U.S. Pats. 3,017,415; 3,080,-282; and 3,183,239. This technique can be briefly described as the reaction of the parent benzimidazole (i.e., the 5-substituted benzimidazoles described above) in a sodium hydroxide emulsion, with an alkyl, aralkyl, or acyl halide preferably the alkyl, aralkyl, or acylchloride, bromide, or iodide. By acyl is preferably meant loweralkanoyl, such as formyl, acetyl, etc. This reaction yields both the 1,5- and the 1,6-isomers, since the reaction at the nitrogen atom is non-specific, and it will be seen by one skilled in the art that both isomers will be formed.

1-carbamoyl benzimidazoles of this invention are also prepared from the parent benzimidazole by treating the parent benzimidazole with an isocyanate in a suitable organic solvent such as acetonitrile. Thus, 1-n-butylcarbamoyl-5-isopropylcarbonylamino - 2 - (4'-thiazolyl)benzimidazole is prepared by treating 5-isopropoxycarbonylamino-2-(4'-thiazolyl)benzimidazole with n-butylisocyanate. The reaction is carried out at reflux temperature and is usually complete in about 2 to 6 hours. The product is recovered by extracting the reaction mixture with chloroform and is isolated by chromatography of the chloroform extract through silica gel.

Benzimidazoles of this invention having an alkoxycarbonyl radical at the 1-position are prepared by treating the parent benzimidazole with an alkyl haloformate, preferably a chloroformate. This reaction is carried out in substantially the same manner as heretofore described for preparaiton of the 5-carbamate species col. 4, lines 40–75, and col. 5, lines 1–29 (above). Because of the tautomeric nature of the benzimidazole nucleus, there will be formed also some 1,6-disubstituted benzimidazole in the foregoing preparations.

An alternate process for preparing 1,5- and 1,6-substituted benzimidazole of this invention involves the nitration of a 1-hydroxy-2-$R_1$-benzimidazole. Many of this type of starting compounds are described in U.S. Pats. 3,265,-706 and 3,429,890. Specific compounds not actually found in these references can be easily prepared using the technique described in U.S. 3,265,706. The starting material for this latter technique utilizes a 2-nitro-N-($R_1$-substituted methyl) aniline.

Once the 1-hydroxy-2-$R_1$-benzimidazole is prepared, however, this compound is reacted with nitric acid in the presence of sulfuric acid, or a strong mineral acid. The reaction takes place at low temperatures (from about 0°–20° C.). The product obtained contains a mixture of both 1-hydroxy-5-nitro-2-$R_1$-benzimidazole and 1-hydroxy-6-nitro-2-$R_1$-benzimidazole. Once these products are separated and purified, using techniques known in the art, they can be reduced to the 1-hydroxy-5-(or 6-)amino-2-$R_1$-benzimidazoles. These latter compounds can be employed as intermediates in the various preparations described above in the same way as were the 5(6)-amino-2-$R_1$-benzimidazoles. After the desired carbonylamino or thiocarbonylamino substituent is prepared at 5- or 6-, the 1-hydroxy group can then be reacted to give the group of $R_2$ substitutents having an oxygen-nitrogen bond. These reactions at position-1 will be more fully described below.

The desired 1 - hydroxy - 5(or 6-) - carbonylamino (or thiocarbonylamino) - 2 - $R_1$ - benzimidazole can also be prepared using the following compounds as starting materials:

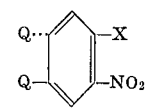

V wherein X is a halo group, preferably chloro, or fluoro, operably also bromo and iodo; and Q is an —$NH_2$ or a —$NO_2$ group. The dotted line indicates that Q can be located in either position, but not both. Where the starting material has Q located in the dotted position, the 1,5-benzimidazole is formed; when Q is located in the solid position, the 1,6-benzimidazole is formed.

The di-nitrohalobenzene, or the nitro-haloaniline described in Formula V is first reacted with an aminomethyl-heterocyclic compound:

wherein $R_1$ is as defined above. This condensation reaction takes place by heating together the two reactants on a steam bath, or other means. The compound thereby formed is a N-(substituted methyl)-aniline having the following formula:

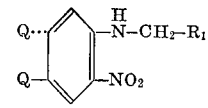

VI

Q being unchanged during the condensation reaction.

At this point, if Q in Compound VI is amino, the carbonylamino or thiocarbonylamino group is substituted onto the ring in the same manner as described above. Once this is accomplished, the intermediate compound

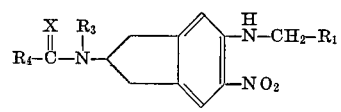

VII is produced. Compound VII can then be reacted using the processes described in U.S. Pats. 3,265,706 and 3,429,890 to yield the desired 1-hydroxy - 5 - (or 6-)-substituted-2-$R_1$-benzimidazole.

If Q in Compound VI is nitro, the order of these processes described above is changed, with necessary modifications. The benzimidazole ring is closed first, yielding the compound

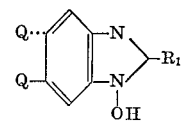

VIII

Compound VIII is then reduced at the nitro group and reacted as described elsewhere to yield the desired intermediate 1 - hydroxy - 5 - (or 6-) - substituted - 2 - $R_1$-benzimidazole.

The 1 - hydroxy - 5 - (or 6-)substituted benzimidazole is then employed in a variety of reactions to yield compounds having the desired 1-$R_2$-5-(or 6-)substituted-2-$R_1$-benzimidazole of Formula I or II.

The benzimidazoles of this invention wherein the $R_2$ substituent is phosphonoloweralkoxy or a loweralkyl ester thereof, sulfoloweralkoxy, loweralkylthioloweralkoxy, imidazolinoloweralkoxy or a 1 - loweralkyl derivative thereof, 1,4,5,6 - tetrahydropyrimidinoloweralkoxy or a 1 - loweralkyl derivative thereof, loweralkanoyloxy, α - aminocarboxyloweralkoxy, glycosyloxy, p-loweralkylphenacyloxy and p - loweralkoxyphenacyloxy may be prepared by treating a solution of the 1-hydroxybenzimidazole starting material in a suitable organic solvent with a haloloweralkylphosphonic acid (preferably in the form of an alkali metal salt), a loweralkyl ester of a haloloweralkylphosphonic acid, a haloloweralkylsulfonic acid (preferably in the form of an alkali metal salt), a loweralkylthioloweralkyl halide, an imidazolinoloweralkyl halide or 1-loweralkyl derivative thereof, a 1,4,5,6-tetrahydropyrimidinoloweralkyl halide or a 1 - loweralkyl derivative thereof, a loweralkanoic acid halide, an α-aminocarboxyloweralkyl halide, a glycosyl halide, an α - halo - p - loweralkylacetophenone, respectively, in the presence of a base such as an alkali metal alkoxide, an alkali metal hydroxide or sodium hydride. The reaction may be carried out at temperatures ranging from room temperature to 100° C. and usually is complete in about 2 to about 30 hours. The 1-ether and 1-ester benzimidazoles so produced then may be recovered and purified by conventional recrystallization techniques.

Those benzimidazoles of the instant invention wherein the substituent at the 1 - position is imidazolylaminoloweralkoxy or a 1 - loweralkyl derivative thereof, 1,4,5,6 - tetrahydropyrimidinylaminoloweralkoxy or a 1-loweralkyl derivative thereof, thiazolinylaminoloweralkoxy, thiazinylaminoloweralkoxy and guanidinoloweralkoxy may be prepared by treating the corresponding 1-aminoloweralkoxybenzimidazole with 2 - methylthio-2-imidazoline or a 1 - loweralkyl derivative thereof, 2-methylthio - 1,4,5,6 - tetrahydropyrimidine or a 1-loweralkyl derivative thereof, 2 - methylthio - 2 - thiazoline, 2-methylthio - 2 - thiazine or 2-methyl-2-thiopseudourea, respectively. The reaction is carried out in a suitable organic solvent and, conveniently, is carried out by refluxing the reaction mixture for about 12 to about 24 hours. The products may be recovered by evaporation of the reaction mixture followed by conventional purification techniques.

The 1-aminoloweralkoxybenzimidazoles employed in the reaction described above may be obtained by treating a 1-hydroxybenzimidazole starting material in the presence of a base, in the manner already described, with a N-haloloweralkylphthalimide to produce the corresponding 1-(N-phthalimidoloweralkoxy)benzimidazole which, upon treatment with hydrazine hydrate, is converted into the desired 1-aminoloweralkylbenzimidazole. The 1-(N-phthalimidoloweralkoxy)benzimidazole intermediate in a suitable organic solvent is refluxed in the presence of hydrazine hydrate for 1 to 2 hours. Evaporation of the solvent followed by extraction with dilute mineral acid and subsequent basification of the acid extract precipitates the 1-aminoloweralkoxybenzimidazole which is recovered by conventional techniques.

These 1-aminoloweralkoxybenzimidazoles serve as intermediates also for introducing a variety of additional substituents at the 1-position including biguanidoloweralkoxy, aminoguanidinoloweralkoxy, various N-loweralkyl guanidinoloweralkoxy and aminoguanidinoloweralkoxy groups and N-amidinoloweralkoxy and N-loweralkyl derivatives thereof. Thus, the 1-biguanidolower-alkoxy group may be introduced by treating the 1-amino-lower-alkoxybenzimidazole at reflux in an acidic aqueous solvent with dicyandiamide followed by evaporation of the solvent and conventional recovery of the 1-(1-biguanido) loweralkoxybenzimidazole product. The aminoguanidinoloweralkoxy substituent may be added at the 1-position by treating the 1-aminoloweralkoxybenzimidazole with nitroguanidine at reflux in a suitable organic solvent to obtain the corresponding 1-nitroguanidinoloweralkoxybenzimidazole which is converted into a desired 1-aminoguanidinobenzimidazole by conventional catalytic reduction.

In order to prepare those benzimidazoles of this invention wherein the 1-substituent is a N-loweralkyl substituted guanidinoloweralkoxy or aminoguanidinoloweralkoxy group, the 1-aminoloweralkoxybenzimidazole intermediate (or an N-loweralkyl derivative thereof) first is converted into an appropriately substituted S-loweralkylisothiouronium salt by treating the 1-amino (or 1-loweralkylamino)loweralkoxybenzimidazole with a loweralkylisothiocyanate or with a diloweralkylthiocarbamoyl halide to form the corresponding 1-(loweralkylthioureidoloweralkoxy)benzimidazole which then is alkylated by treatment with a loweralkyl halide, preferably methyl iodide, to form the corresponding S-loweralkylisothiouronium salt.

The 1-(N-loweralkylaminoloweralkoxy)benzimidazoles which may be employed in the reactions described above are readily prepared by treating the 1-hydroxybenzimidazole starting materials previously disclosed with a halolower alkanol in the manner already described to form the corresponding 1-hydroxyloweralkoxybenzimidazole which then may be treated with thionyl chloride to form the corresponding 1-chloroloweralkoxybenzimidazole. Reaction between this compound and a loweralkylamine produces the desired 1-N-loweralkylaminoloweralkoxy benzimidazole.

The S-loweralkylisothiouronium salts prepared above then may be treated with ammonia or a loweralkylamine to displace the loweralkylthio group and form any desired N'-, $N_1$-, $N_2$-, or $N_1$, $N_2$, $N_3$-loweralkylsubstituted 1-guanidinoloweralkoxybenzimidazole. Similarly, the S-loweralkylisothiouronium salt may be treated with hydrazine or with any desired loweralkyl substituted hydrazine, such as, for example, 1-methylhydrazine, 1,1-diethylhydrazine, 1,1-dimethyl-2-ethylhydrazine and the like, to form corresponding N'-, $N_1$-, $N_2$- and $N_3$-loweralkyl substituted 1-aminoguanidinoloweralkoxybenzimidazoles.

Those benzimidazoles of this invention wherein the substituent at the 1-position is N-amidinoloweralkoxy or an N-loweralkyl derivative thereof may be prepared by treating the 1-aminoloweralkoxybenzimidazole intermediate with a loweralkyl ortho ester, such as, for example, trimethyl or triethyl orthoformate, orthoacetate, orthopropionate, orthobutyrate and the like, in the presence of a catalytic quantity of hydrochloric acid to form the corresponding methyl or ethyl amino ether which then may be treated with ammonia or a mono- or diloweralkylamine to form the desired 1-N-amidinoloweralkoxybenzimidazole quantity of the hydrochloride salt of the 1-aminoloweralkoxybenzimidazole may be employed as the source of the catalyst.

Alternatively, the 1 - N - amidinoloweralkoxybenzimidazoles of this invention, and N-loweralkyl derivatives thereof, may be prepared directly by treating the 1-aminoloweralkoxybenzimidazole intermedite, or a N-loweralkyl derivative thereof, with a loweralkyl imino ester hydrochloride, such as, for example, the hydrochloride of methyl or ethyl formimidate, acetimidate, propionimidate and the like, in a suitable organic solvent. This reaction may be carried out at ambient temperatures and usually is complete in from 12 to 24 hours.

The 1-C-amidinoloweralkoxylbenzimidazoles of this invention may be prepared by treating a 1-hydroxybenzimidazole starting material as described above with a haloloweralkylnitrile in the presence of a base to form the corresponding 1-(cyanoloweralkoxy)benzimidazole. This reaction is carried out by techniques already described. The 1-(cyanoloweralkoxy)benzimidazole intermediate then may be treated with ethanolic hydrogen chloride solution at about 0° C. to convert the nitrile group in the imino ethyl ester which then may be treated with ammonia or with a mono- or diloweralkylamine to form the desired C-amidinoloweralkoxybenzimidazole or an N-loweralkyl derivative thereof. Further alkylation of the C-amidinoloweralkoxybenzimidazoles so produced may be achieved by direct alkylation of the amidinoloweralkoxy group with a loweralkyl halide, preferably a loweralkyl iodide. The alkylation is usually carried out at reflux in a suitable organic solvent and generally is complete in about 8 to 16 hours. The products may be isolated as the hydroiodide salt or converted into the free base by conventional neutralization techniques.

The 1-loweralkylthioloweralkoxybenzimidazoles of this invention, which are prepared as described above, may be converted into the corresponding sulfoxide or sulfone derivative by oxidizing the 1-loweralkylthioloweralkoxybenzimidazole with an organic peracid such as peracetic acid, trifluoroperacetic acid and metachloroperbenzoic acid. One molar equivalent of the organic peracid is required for formation of the sulfoxide derivative and two molar equivalents of the organic peracid are needed to form the sulfone derivative. The oxidations may be carried out by the required quantity of organic peracid to a cold solution of the 1-loweralkylthioloweralkoxybenzimidazole in a suitable organic solvent. After the addition of peracid is complete the reaction mixture may be allowed to warm to room temperature and is stirred from 6 to 18 hours. After extraction of the reaction mixture with aqueous bicarbonate solution, the products may be recovered from the organic layer by conventional techniques.

Those benzimidazoles of this invention wherein the substituent at the 1-position is phosphotoloweralkoxy may be prepared by treating the corresponding 1-hydroxyloweralkoxybenzimidazole with a mixture of phosphoric acid anhydride and orthophosphoric acid at room temperature for 12-30 hours. Dilution of the reaction mixture with water precipitates the desired benzimidazol-1-yloxyloweralkyl phosphate which may be recovered and purified by conventional techniques. The 1-hydroxyloweralkoxybenzimidazole intermediate may be prepared by treating the 1-hydroxybenzimidazole starting material described above with a haloloweralkanol in the presence of a base in the manner previously described.

Where loweralkyl esters of the 1-phosphotoloweralkoxybenzimidazoles prepared above are desired, the 1-hydroxyloweralkoxybenzimidazole intermediate described above may be treated with a mono- or di-loweralkyl phosphoryl halide, preferably the chloride, in a suitable organic solvent. The reaction is carried out at low temperatures, preferably between 0° and 5° C. and is usually complete in about 1 to 4 hours. Dilution of the reaction mixture with water followed by extraction with a suitable organic solvent and evaporation of the organic phase yields the desired 1-phosphotoloweralkoxy loweralkyl ether.

As noted above, those 1-ether benzimidazoles of this invention wherein the 1-substituent is of acidic character, such as sulfoloweralkoxy, phospholoweralkoxy, phosphotoloweralkoxy and α-aminocarboxyloweralkoxy, will form salts with alkali metals, alkaline earth metals and pharmaceutically acceptable amines. When the 1-ether benzimidazoles of this invention bear a substituent of basic character at the 1-position, such as C-amidinoloweralkoxy, N-amidinoloweralkoxy, biguanidinoloweralkoxy, guanidinoloweralkoxy, aminoguanidinoloweralkoxy, imidazolylaminoloweralkoxy, 1,4,5,6-tetrahydropyrimidinylaminoloweralkoxy, thiazolinylaminoloweralkoxy, thiazinylaminoloweralkoxy and α-aminocarboxyloweralkoxy, they will form salts with pharmaceutically acceptable acids. Many of these salts display greatly enhanced water solubility as compared with the parent benzimidazole and are highly useful in applications where water soluble formulations are desired. These salts may be formed by conventional techniques such as, for example, by contacting the 1-etherbenzimidazole with the desired acid or base followed by evaporation of the reaction mixture and conventional recovery and purification of the salt.

In accordance with an additional embodiment of our invention there are also provided 2-$R_1$-benzimidazoles (where $R_1$ is as previously defined) having at the 5-(or 6-)position an alkyl or aryl sulfonylamino substituent, examples of such compounds being those wherein the 5-(or 6-) substituent is methylsulfonylamino, ethylsulfonylamino, phenylsulfonylamino, and tolylsulfonylamino. These novel compounds are obtained by reaction of the appropriate 2-$R_1$-5(or 6-)-amino benzimidazole with an alkyl or aryl sulfonyl halide, and preferably an alkyl or aryl sulfonyl chloride. In addition to having anthelmintic activity per se, these compounds serve as valuable intermediates in the preparation of the benzimidazoles of this invention wherein $R_3$ substituent is a loweralkyl radical.

It has been found that 5-(or 6-)alkyl or aryl sulfonylamino benzimidazoles are readily converted into the corresponding 5-(or 6-)N-alkyl or aryl sulfonylamino benzimidazole by treating the 5-(or 6-) alkyl or aryl sulfonylamino benzimidazole with an alkyl halide in an organic solvent such as methanol. The reaction is carried out in the presence of an alkali metal alkoxide such as sodium methoxide which serves as an acid binding agent. The 5-(or 6-)N-alkyl alkyl or aryl sulfonylamino benzimidazoles so produced then may be converted into the corresponding 5-(or 6-)alkylamino benzimidazoles by refluxing in a concentrated mineral acid such as concentrated hydrochloric acid. These 5-(or 6-) alkylamino benzimidazoles, then are employed as intermediates in the various preparations described above in the same way as were the 5-(or 6-)amino benzimidazoles.

As stated previously, the compounds of Formulae I and II hereinabove have significant activity as anthelmintics. The disease or group of diseases described generally as helminthiasis is due to infestation of the animal body with parasitic worms known as helminths. Helminthiasis is a prevalent and serious economical problem in domesticated animals such as swine, sheep, cattle, goats, dogs and poultry. Among the helminths, the group of worms described as nematodes causes widespread and often times serious infection in various species of animals. The most common genera of nematodes infecting the animals referred to above are Haemonchus, Trichostrongylus, Ostertagia, Nematodirus, Cooperia, Bunostomum, Oesophagostomum, Chabertia, Trichuris (whipworm), Ascaris, Capillaria, Heterakis and Ancylostoma. Certain of these, such as Trichostrongylus, Nematodirus and Cooperia, attack primarily the intestinal tract while others, such as Haemonchus and Ostertagia, are more prevalent in the stomach. The parasitic infections known as helminthiasis lead to anemia, malnutrition, weakness, weight loss, severe damage to the walls of the intestinal tract and, if left untreated, often result in death of the infected animals. The benzimidazoles of our invention have unexpectedly high activity against these helminths. When used as anthelmintic agents they may be administered orally in a unit dosage form such as a capsule, bolus, tablet or as a liquid drench. The drench is normally an aqueous suspension or dispersion of the active ingredient together with a suspending agent such as bentonite and a wetting agent or like excipient. Generally, the drenches also contain an antifoaming agent. Alternatively, ready to use drench formulations, such as those described in U.S. Pat. No. 2,918,403, may be employed. Preferred drench formulations containing from about 5 to 50% by weight of the benzimidazole. The capsules and boluses comprise the active ingredient admixed with a carrier vehicle such as starch, talc, magnesium stearate, or dicalcium phosphate.

Where it is desired to administer the benzimidazole in dry, solid unit dosage form, capsules, boluses or tablets containing the desired amount of benzimidazole usually are employed. These dosage forms are prepared by intimately and uniformly mixing the active ingredient with suitable finely divided diluents, fillers, disintegrating agents and/or binders such as starch, lactose, talc, magnesium stearate, vegetable gums and the like. Such unit dosage formulations may be varied widely with respect to their total weight and content of anthelmintic agent depending upon factors such as the type of host animal to be treated, the severity and type of infection and the weight of the host.

When the anthelmintic is to be administered via the animal feedstuff, it is intimately dispersed in the feed or else used as a top dressing or in the form of pellets which are then added to the finished feed. Alternatively, the anthelmintics of our invention may be administered to animals parenterally, for example, by intraruminal, intramuscular, intratracheal, or subcutaneous injection in which event the benzimidazole is dissolved or dispersed in a liquid carrier vehicle.

Although the anthelmintic agents of this invention find their primary use in the treatment and/or prevention of helminthiasis in domesticated animals, such as sheep, cattle, horses, dogs, swine and goats, they are also effective in treatment of helminthiasis that occurs in other living animals. The optimum amount to be employed for best results will, of course, depend upon the particular benzimidazole employed, the species of animal to be treated and the type and severity of helminth infection. Generally, good results are obtained with our novel compounds by the oral administration of from about 5 to 125 mg. per kg. of animal body weight, such total dose being given at one time or in divided doses over a relatively short period of time such as 1–2 days. With the preferred compounds of the invention, excellent control of helminthiasis is obtained in domesticated animals by administering from about 10 to 70 mg. per kg. of body weight in a single dose. The techniques for administering these materials to animals are known to those skilled in the veterinary field.

When the compounds described herein are administered as a component of the feed of the animals, or dissolved or suspended in the drinking water, compositions are provided in which the benzimidazole is intimately dispersed in an inert carrier or diluent. By inert carrier is meant one that will not react with the benzimidazole and one that may be administered safely to animals. Preferably, the carrier is one that is, or may be, an ingredient of the animal ration.

Suitable compositions include feed supplements in which the active ingredient is present in relatively large amounts and which are suitable for addition to the feed either directly or after an intermediate dilution or blending step. Typical carriers or diluents suitable for such compositions include, for example, distillers' dried grains, corn meal, citrus meal, fermentation residues, ground oyster shells, wheat shorts, molasses solubles, corn cob meal, edible bean mill feed, soya grits, crushed limestone and the like. The active benzimidazoles are intimately dispersed throughout the carrier by methods such as grinding, stirring, milling or tumbling. Compositions containing from about 5 to 50% by weight of the benzimidazole are particularly suitable as feed additives.

Examples of typical feed supplements containing the benzimidazoles of this invention dispersed in a solid carrier are:

Lbs.

(A)

5(6) - isopropoxy - carbonylamino - 2 - (4' - thiazolyl)-benzimidazole _____ 20
Corn distiller's dried grains _____ 80

(B)

6 - benzoylamino - 1 - [2 - (N - formamidino)ethoxy]-2-(4'-thiazolyl)benzimidazole _____ 5
Wheat standard middling _____ 95

(C)

5 - ethoxycarbonylamino - 1 - [2-(guanidino)ethoxy]-2-(4'-thiazolyl)-benzimidazole _____ 35
Wheat shorts _____ 65

(D)

6 - (p - fluorobenzoylcarbonylamino) - 2 - [2-(4'-thiazolyl)-benzimidazol-1-yl]-oxyethyl sulfonate _____ 50
Corn distiller's grains _____ 50

These, and similar feed supplements, are prepared by uniformly mixing the benzimidazole with the carrier.

Such supplements are added to the animal feed in an amount to give the finished feed the concentration of benzimidazole desired for the treatment and control of helminthiasis. Although the desired concentration of active will vary depending upon the factors previously mentioned as well as upon the particular benzimidazole employed, the 1-ether and 1-ester benzimidazoles of this invention are usually fed at concentrations of between 0.5 to 2.0% in the feed in order to achieve the desired anthelmintic result.

Certain of the $2$-$R_1$-5-amino benzimidazoles employed as starting materials in the processes of our invention have been reported in the literature. These, as well as those which have not been specifically described, may be prepared from the $2$-$R_1$-benzimidazole unsubstituted at the 5-position (wherein $R_1$ is as previously defined) by reaction of such 5-unsubstituted compound with nitric acid in the presence of sulfuric acid which gives essentially selective nitration at the 5-position and thus affords the corresponding $2$-$R_1$-5-nitrobenzimidazole. This latter substance is then conveniently reduced to the 5-amino compound by catalytic hydrogenation in the presence of palladium-on-charcoal catalyst. Details of these procedures, as well as alternative procedures, are set forth below.

PREPARATION OF 5-NITRO BENZIMIDAZOLES (A) 5-nitro-2-(4'-thiazolyl)benzimidazole 10 g. of 2-(4'-thiazolyl)benzimidazole is dissolved with cooling in 20 ml. of concentrated sulfuric acid. To this solution is added dropwise with cooling and stirring a mixture of 4 ml. of concentrated nitric acid and 6 ml. of concentrated sulfuric acid, maintaining the temperature between 20° and 30° C. The reaction mixture is allowed to stir for a further five minutes at room temperature then poured onto ice and made just basic with ammonium hydroxide. The solid 5-nitro-2-(4'-thiazolyl)benzimidazole is filtered off and washed with water. It is recrystalized from dimethylformamide to give pale yellow needles of 5 - nitro - 2 - (4' - thiazolyl)benzimidazole, M.P. 240–241° C.

By employing equivalent molar quantities of benzimidazoles such as, for example:

2-[3'-(1',2',5'-thiadiazolyl)]benzimidazole,
2-[4'-(1',2',3'-thiadiazolyl)]benzimidazole,
2-[2'-(1',3',4'-thiadiazolyl)]benzimidazole,
2-(1'-pyrazolyl)benzimidazole,
2-(2'-methyl-4'-thiazolyl)benzimidazole,
2-(2'-oxazolyl)benzimidazole,
2-(2'-thiazolyl)benzimidazole, or
2-(2'-imidazolyl)benzimidazole in the above procedure in place of the 2-(4'-thiazolyl)- benzimidazole, there is obtained the corresponding 5-nitro derivative.

The foregoing nitration procedure is highly satisfactory for those compounds in which the heteroaryl substituent at the 2-position is not readily nitrated. In cases where the 2-substituent may be nitrated along with the 5-position of the benzimidazole ring, an alternate synthesis of the 2-$R_1$-5-amino benzimidazoles is utilized which comprises the reaction of o-amino-p-nitroaniline with a heteroaryl aldehyde in the presence of nitrobenzene or cupric diacetate. This method is illustrated below.

(B) 5-nitro-2-(2'-furyl)benzimidazole 2.2 g. of 2-furfuryl aldehyde in 3 ml. of ethanol is added to a suspension of 3 g. of o-amino-p-nitroaniline in 10 ml. of nitrobenzene. The resulting mixture is stirred for 10 minutes at room temperature and then heated slowly to 210° C. for one minute. The methanol is allowed to distil during this heating. The mixture is then cooled to about 5° C. to crystallize the 5-nitro-2-(2'-furyl)benzimidazole which is recovered by known methods, M.P. 224° C.

(C) 5-nitro-2-(2'-pyrryl)benzimidazole 43.2 g. of pyrrole-2-aldehyde in methanol is added to a suspension of 54.0 g. of o-amino-p-nitroaniline and 160 g. of cupric diacetate in methanol (total of 1 liter) and this mixture is then heated at reflux temperature for 2 hours. The mixture is cooled to room temperature and the copper complex of the product is removed by filtration and suspended in ethanol and then treated with gaseous hydrogen sulfide to give 5-nitro-2-(2'-pyrryl)-benzimidazole, M.P. 259–260° C.

By employing an equivalent molar quantity of thiophene-2-aldehyde in the above reaction in place of the pyrrole-2-aldehyde, there is obtained 5-nitro-2-(2'-thienyl)benzimidazole.

PREPARATION OF 5-AMINO BENZIMIDAZOLES 5-amino-2-(4'-thiazolyl)benzimidazole.—A suspension of 141 g. of 5-nitro-2-(4'-thiazolyl)benzomidazole in 4 liters of dry ethanol is reduced with 22 g. of 5% palladium on carbon catalyst and hydrogen at 24° C. and 45 p.s.i. The theoretical amount of hydrogen is absorbed in approximately 5½ hours. The catalyst is then filtered off and the solvent evaporated to near dryness. The solid is recovered by filtration and washed with ether to afford 5-amino-2-(4'-thiazolyl)benzimidazole as a yellow solid. It is dissolved in absolute ethanol and crystallized by addition of hexane to give substantially pure material, M.P. 232–233° C.

By employing equivalent molar quantities of the 5-nitro-2-$R_1$ benzimidazoles prepared as described in the foregoing section in the above procedure instead of the 5-nitro-2-(4'-thiazolyl)benzimidazole, corresponding 5-amino-2-$R_1$-benzimidazoles are obtained.

The foregoing methods for making 2-$R_1$-5-amino benzimidazoles are not a part of the present invention, although the selective nitration of a 2-$R_1$-benzimidazole to a 2-$R_1$-5-nitrobenzimidazole and reduction of the latter compound to 2-$R_2$-5-aminobenzimidazole is a separate invention and will be claimed elsewhere.

Most of the haloformates, halothioformates and acylhalides used as the second reactant in the process of our invention are known; those not specifically reported in the literature are prepared by known methods.

The following examples are given for the purpose of illustration and not by way of limitation.

EXAMPLE 1

5-methoxycarbonylamino-2-(4'-thiazolyl)benzimidazole

To a suspension of 2.16 g. of 5-amino-2-(4'-thiazolyl)benzimidazole in 7.5 ml. of pyridine there is added dropwise with stirring 1 g. (.815 ml.) of methyl chloroformate. The mixture is allowed to stir for a further two hours at room temperature and then several volumes of ice and water are added to precipitate the product. The solid thus obtained is collected by filtration and washed with water to give 5-methoxy-carbonylamino-2-(4'-thiazolyl)benzimidazole, M.P. 225–226° C. It is dissolved in methanol, the solution treated with decolorizing charcoal and then evaporated to near dryness. 5-methoxycarbonylamino-2-(4'-thiazolyl)benzimidazole crystallizes and is recovered by filtration and dried in vacuo for two hours at 65° C. to afford pure material, M.P. 237–239° C.

EXAMPLE 2

5-methoxycarbonylamino-2-(4'-thiazolyl)benzimidazole 3.86 g. of methyl chloroformate in 100 ml. of acetone are added at room temperature to a stirred solution of 10.2 g. of 5-amino-2-(4'-thiazolyl)benzimidazole in 300 ml. of acetone, and the resulting mixture stirred for one hour at room temperature. At the end of this time the solid product is collected by filtration, washed with acetone and dissolved in water. The aqueous solution is made basic with sodium bicarbonate and the resulting precipitate filtered off and washed with water. The solid is dissolved in a minimum volume of hot methanol, the methanol solution treated with decolorizing charcoal, filtered and the methanol filtrate evaporated to a small volume. 5 - methoxycarbonylamino-2-(4'-thiazolyl)benzimidazole crystallizes and is recovered by filtration, M.P. 220–222° C. The product is recrystallized from methanol and then dried for two hours in vacuo at 65° C. to give substantially pure 5 - methoxycarbonylamino-2-(4'-thiazolyl)benzimidazole, M.P. 234–235° C.

EXAMPLE 3

5-ethoxycarbonylamino-2-(4'-thiazolyl)benzimidazole 2.27 g. of ethyl chloroformate are added dropwise over a 10 minute period to a stirred solution of 4.32 g. of 5-amino-2-(4'-thiazolyl)benzimidazole in 15 ml. of pyridine. The resulting mixture is stirred for two hours at room temperature, then poured onto ice and diluted with water to a volume of about 300 ml. The resulting solid product is removed by filtration and washed with water. It is crystallized from a mixture of methanol-ether-petroleum ether, with a decolorizing charcoal treatment of the solution, to give the methanol solvate of 5-ethoxycarbonyl-amino-2-(4'-thiazolyl)benzimidazole, M.P. 94–105° C.

When the above reaction is repeated and the solid product that is recovered from the aqueous solution is recrystallized from acetonitrile-ether, there is obtained substantially pure 5 - ethoxycarbonylamino-2-(4'-thiazolyl) benzimidazole, M.P. 203–205° C.

EXAMPLE 4

5-propoxycarbonylamino-2-(4'-thiazolyl)benzimidazole 2.60 g. of n-propyl chloroformate are added at room temperature to a stirred solution of 4.32 g. of 5-amino-2-(4'-thiazolyl)benzimidazole in 15 ml. of pyridine. The resulting mixture is stirred at room temperature for 2 hours then poured onto ice and the mixture diluted with water to a volume of about 300 ml. A dark oil separates and is recovered by decanting the mother liquors. The oil is washed with water and then dissolved in methanol. The methanolic solution is filtered, evaporated to near dryness in vacuo and the residue dried by adding benzene and removing the benzene by distillation. The residue is then crystallized from methanol-ether-petroleum ether, the crystals separated and air dried to give 5-propoxycarbonyl-amino-2-(4'-thiazolyl)benzimidazole, M.P. 214–215° C.

EXAMPLE 5

5-n-butoxycarbonylamino-2-(4'-thiazolyl)benzimidazole 4.32 g. of 5-amino-2-(4'-thiazolyl)benzimidazole are added to 15 ml. of pyridine, and to the resulting mixture there is added with stirring over a 10 minute period 2.9 g. of n-butyl chloroformate. The mixture is stirred for two hours at room temperature, then poured onto ice and diluted to 300 ml. with water. The resulting solid product is collected by filtration, washed with ice water and recrystallized from methanol to give substantially pure 5-n-butoxycarbonylamino - 2 - (4'-thiazolyl)benzimidazole, M.P. 211–212° C.

EXAMPLE 6

5-amyloxycarbonylamino-2-(4'-thiazolyl)benzimidazole

When the procedure of Example 5 is repeated employing 3.2 g. of n-amyl chloroformate instead of butyl chloroformate, there is obtained 5-amyloxycarbonylamino-2-(4'-thiazolyl)benzimidazole, M.P. 178–179° C.

EXAMPLE 7

5-n-hexyloxycarbonylamino-2-(4'-thiazolyl)benzimidazole

The procedure of Example 5 is repeated using 3.5 g. of n-hexyl chloroformate instead of butyl chloroformate. The 5-n-hexyloxycarbonylamino-2-(4'-thiazolyl) - benzimidazole thus obtained melts at 150–152° C.

EXAMPLE 8

5-n-octyloxycarbonylamino-2-(4'-thiazolyl)benzimidazole

When the procedure of Example 5 is carried out replacing the butyl chloroformate of that example with 4.05 g. of n-octyl chloroformate, there is obtained 5-n-octyloxycarbonylamino - 2 - (4'-thiazolyl)benzimidazole, M.P. 66–67° C.

EXAMPLE 9

5-phenoxycarbonylamino-2-(4'-thiazolyl)benzimidazole 3.5 g. of phenyl chloroformate are added dropwise over 10 minutes to a mixture of 4.32 g. of 5-amino-2-(4'-thiazolyl)benzimidazole in 18 ml. of dry pyridine. There is an exothermic reaction and the temperature rises to about 60° C. The mixture is cooled to about room temperature and stirred for about two hours then diluted with water to a volume of 500 ml. The container is scratched to induce crystallization and the resulting crystals collected, washed with cold water and dried to give 5-phenoxycarbonylamino-2-(4'-thiazolyl)benzimidazole.

This material is dissolved in a minimum volume of methanol, the solution treated with decolorizing charcoal and concentrated to a small volume. About 1/10 volume of ether is added and the resulting solid product collected by filtration and dried in vacuo to afford 5-phenoxycarbonylamino - 2-(4'-thiazolyl)-benzimidazole, M.P. 115–116° C.

EXAMPLE 10

5-n-fluorophenoxycarbonylamino-2-(4'-thiazolyl)benzimidazole

Employing the process of Example 9 using 4.63 g. of p-fluorophenylchloroformate instead of the phenyl chloroformate, there is obtained 5 - p-fluorophenoxycarbonylamino-2-(4'-thiazolyl)benzimidazole, M.P. 275–280° C.

EXAMPLE 11

5-o-fluorophenoxycarbonylamine-2-(4'-thiazolyl)benzimidazole 4.63 g. of o-fluorophenyl chloroformate were added dropwise to a mixture of 4.35 g. 5-amino-2-(4'-thiazolyl)-benzimidazole in 35 ml. of dimethyl formamide. After 2½ hours, 500 ml. of ether is added and the powder which separates is collected and treated with aqueous ammonia yielding 5 - o-fluorophenoxycarbonylamino-2-(4'-thiazolyl)benzimidazole, M.P. 135–140° C.

EXAMPLE 12

5-isobutyoxycarbonylamino-2-(4'-thiazolyl)benzimidazole 2.9 g. of isobutyl chloroformate is added dropwise to a mixture of 4.32 g. of 5-amino-2-(4'-thiazolyl)-benzimidazole in 20 ml. of dry pyridine, the addition being carried out at room temperature. The mixture is stirred at room temperature for 90 minutes and then about 200 ml. of ice water are added. The resulting solid is collected by filtration and washed with water. It is dissolved in a minimum volume of methanol and the methanol solution treated with decolorizing charcoal. The charcoal is filtered off and the clear solution evaporated to a small volume and a small amount of water added to induce crystallization. 5-isobutyoxycarbonylamine - 2-(4'-thiazolyl)benzimidazole crystallizes and is separated and dried, M.P. 231–232° C.

EXAMPLE 13

5-isopropyloxycarbonylamino-2-(4'-thiazolyl)benzimidazole

The procedure of Example 12 is repeated employing 2.6 g. of isopropyl chloroformate. There is obtained 5-isopropyloxycarbonylamino - 2 - (4'-thiazolyl)benzimidazole, M.P. 212–214° C.

EXAMPLE 14

5-allyloxycarbonylamino-2-(4'-thiazolyl)benzimidazole

The procedure of Example 12 is repeated using 3.12 g. of allylchloroformate in place of isobutyl chloroformate to afford 5-allyloxycarboylamino - 2 - (4'-thiazolyl)benzimidazole, M.P. 210–212° C.

EXAMPLE 15

5-(2-propynyl)-oxycarbonylamino-2-(4'-thiazolyl)benzimidazole

When the procedure of Example 12 is repeated using 2.61 g. of 2-propynyl chloroformate in place of isobutyl chloroformate there is obtained 5-(2-propynyl)-oxycarbonylamino - 2-(4'-thiazolyl)benzimidazole, M.P. 200–202° C.

EXAMPLE 16

5-ethylthiolcarbonylamino-2-(4'-thiazolyl)benzimidazole 25.3 g. of ethyl chlorothioformate is added dropwise to a stirred suspension of 40 g. of 5-amino-2-(4'-thiazolyl)benzimidazole in 150 ml. of pyridine. The mixture is stirred for 4 hours and a mixture of ice and water is added to precipitate 5-ethylthiolcarbonylamino - 2 - (4'-thiazolyl)benzimidazole, M.P. 215° C.

EXAMPLE 17

5-cyclopropoxycarbonylamino-2-(4'-thiazolyl)benzimidazole

A mixture of 1.1 g. of 5-ethylthiolcarbonylamino-2-(4'-thiazolyl)benzimidazole and 0.15 g. of dibutyltin-oxide in 1.5 g. of cyclopropanol is refluxed for 20 hours. The solvent is evaporated and the residue is crystallized from a mixture of ethyl acetate and hexane to give 5-cyclopropoxycarbonylamino - 2 - (4'-thiazolyl)benzimidazole, M.P. 190–195° C. (hydrate), 207–208° C. (anhydrous).

EXAMPLE 18

5-acetylamino-2-(4'-thiazolyl)benzimidazole

To a suspension of 6.48 g. of 5-amino-2-(4'-thiazolyl)-benzimidazole in 23 ml. of pyridine there is added dropwise at room temperature over a 5–7 minute period 2.4 ml. of acetyl chloride. The resulting mixture is stirred for two hours at room temperature, and ice water then added to a volume of about 200 ml. The solid product is recovered by filtration, washed with water and dried in vacuo for 18 hours to give crude 5-acetylamino-2-(4'-thiazolyl)benzimidazole, M.P. 240–250° C. This product was dissolved in methanol, the solution treated with decolorizing charcoal, filtered and then concentrated to the point of crystallization. It is chilled and the crystals collected, washed with methanol and dried in vacuo to afford substantially pure product, M.P. 260° C.

EXAMPLE 19

5-phenylacetylamino-2-(4'-thiazolyl)benzimidazole

To a mixture of 4.32 g. of 5-amino-2-(4'-thiazolyl)-benzimidazole in 18 ml. of dry pyridine there is added slowly over a 10 minute period at room temperature 3 ml. of phenylacetyl chloride. The mixture is stirred at room temperature for two hours and then the product recovered as in Example 18 to afford 5-phenylacetylamino-2-(4'-thiazolyl)benzimidazole, M.P. 210–211° C.

EXAMPLE 20

5-formylamino-2-(4'-thiazolyl)benzimidazole 4 g. of 5-amino-2-(4'-thiazolyl)benzimidazole is mixed with 300 ml. of 99% formic acid, and the resulting mixture stirred at room temperature for 20 hours. At the end of this time about 300 ml. of ice water are added and the mixture brought to pH 8 with concentrated aqueous ammonium hydroxide. The resulting solid precipitate is separated by filtration and dried to give crude 5-formylamino-2-(4'-thiazolyl)benzimidazole, M.P. 242–244° C. This material is purified by dissolving it in methanol, treating with decolorizing charcoal and filtering, and concentrating until crystallization begins. The resulting pure material melts at 247–248° C.

EXAMPLE 21

5-propionylamino-2-(4'-thiazolyl)benzimidazole

To a mixture of 4.32 g. of 5-amino-2-(4'-thiazolyl)-benzimidazole and 20 ml. of pyridine there is added dropwise 1.85 g. of propionyl chloride. The reaction mixture is stirred for one hour at room temperature and water is then added to the point of cloudiness. The mixture is chilled and the solid product recovered. The solid crystallizes by dissolving in methanol and then evaporating the methanol solution to a small volume. 5-propionylamino-2-(4'-thiazolyl)benzimidazole crystallizes and is recovered by filtration, M.P. 255–256° C.

EXAMPLE 22

5-benzoylamino-2-(4'-thiazolyl)benzimidazole

When the procedure of Example 21 is repeated using 2.81 g. of benzoyl chloride in place of propionyl chloride, there is obtained 5-benzoylamino-2-(4'-thiazolyl)-benzimidazole, M.P. 118–120° C.

EXAMPLE 23

5-nicotinylamino-2-(4'-thiazolyl)benzimidazole 4.56 g. of nicotinic anhydride is added slowly to 4.32 g. of 5-amino-2-(4'-thiazolyl)benzimidazole in 20 ml. of pyridine. The resulting mixture is stirred until the solids are dissolved and then allowed to stand at room temperature for 20 hours. An equal volume of water is then added and the resulting solid product collected by filtration and washed with water. It melts at 282–284° C. This material is dissolved in dimethyl formamide and water added to induce crystallization. The resulting crystals are collected, washed with methanol and ether and dried to afford substantially pure 5-nicotinylamino-2-(4'-thiazolyl)benzimidazole, M.P. 284–285° C.

EXAMPLE 24

5-o-fluorobenzoylamino-2-(4'-thiazolyl)benzimidazole

When the procedure of Example 23 is repeated using 5.24 g. of o-fluorobenzoic anhydride in place of nicotinic anhydride, the resulting crude product crystallized from aqueous methanol, there is obtained substantially pure 5-o-fluorobenzoylamino - 2 -( 4'-thiazolyl)-benzimidazole, M.P. 132–133° C.

EXAMPLE 25

5-(1-adamantanyl)carbonylamino-2-(4'-thiazolyl) benzimidazole

When the procedure of Example 22 is carried out using 3.97 g. of adamantane-1-carbonyl chloride in place of benzoyl chloride, 5-(1-adamantanyl)carbonylamino-2-(4'-thiazolyl)benzimidazole is produced, M.P. 246–247° C.

EXAMPLE 26

5-(2-naphthoylamino)-2-(4'-thiazolyl)benzimidazole

The procedure of Example 22 is repeated using 4 g. of 2-naphthoyl chloride in place of benzoyl, there is obtained in this manner 5-(2-naphthoylamino)-2-(4'-thiazolyl)benzimidazole, M.P. 154–156° C.

EXAMPLE 27

5-cyclopropylcarbonylamino-2-(4'-thiazolyl)-benzimidazole

Following the procedure of Example 21 and substituting 2.3 g. of cyclopropylcarbonyl chloride there is obtained 5 - cyclopropylcarbonylamino - 2 - (4'-thiazolyl)-benzimidazole, M.P. 245° C.

EXAMPLE 28

5-isobutyrlamino-2-(4'-thiazolyl)benzimidazole

Following the procedure of Example 21 and substituting 2.34 g. of isobutyryl chloride for the propionyl chloride, there is obtained 5-isobutyrlamino-2-(4'-thiazolyl)-benzimidazole, M.P. 203–205° C.

EXAMPLE 29

5-(3-thienyl)carbonylamino-2-(4'-thiazolyl)-benzimidazole

Following the procedure of Example 21 and substituting 3.21 g. of thiophene-3-carbonyl chloride for the propionyl chloride, there is obtained 5-(3-thienyl)carbonylamino-2-(4'-thiazolyl)benzimidazole, M.P. 276–278° C.

EXAMPLE 30

5-m-fluorobenzoylamino-2-(4'-thiazolyl)benzimidazole

Following the procedure of Example 21 and substituting 3.4 g. of m-fluorobenzoyl chloride for the propionyl chloride, there is obtained 5-m-fluorobenzoylamino-2-(4'-thiazolyl)benzimidazole, M.P. 232–233° C.

EXAMPLE 31

5-p-fluorobenzoylamino-2-(4'-thiazolyl)benzimidazole

Following the procedure of Example 21 and substituting 3.4 g. of p-fluorobenzoyl chloride for the propionyl chloride, there is obtained 5-p-fluorobenzoylamino-2-(4'-thiazolyl)benzimidazole, M.P. 151–152° C.

EXAMPLE 32

5-o-methoxybenzoylamino-2-(4'-thiazolyl)benzimidazole

Following the procedure of Example 21 and substituting 3.6 g. of o-methoxybenzoyl chloride for the propionyl chloride, there is obtained 5-o-methoxybenzoylamino-2-(4'-thiazolyl)benzimidazole, M.P. 113–114° C.

EXAMPLE 33

5-m-methoxybenzoylamino-2-(4'-thiazolyl)benzimidazole

Following the procedure of Example 21 and substituting 3.75 g. of m-methoxybenzoyl chloride for the propionyl chloride, there is obtained 5-m-methoxybenzoylamino-2-(4'-thiazolyl)benzimidazole, M.P. 105–109° C.

EXAMPLE 34

5-o-phenoxybenzoylamino-2-(4'-thiazolyl)benzimidazole

Following the procedure of Example 21 and substituting 4.87 g. of o-phenoxybenzoyl chloride for the propionyl chloride, there is obtained 5-o-phenoxybenzoylamino-2-(4'-thiazolyl)benzimidazole, M.P. 95–100° C.

EXAMPLE 35

5-o-chlorobenzoylamino-2-(4'-thiazolyl)benzimidazole

Following the procedure of Example 21 and substituting 3.68 g. of o-chlorobenzoyl chloride for the propionyl chloride, there is obtained 5-o-chlorobenzoylamino-2-(4'-thiazolyl)benzimidazole, M.P. 146–147° C.

EXAMPLE 36

5-m-iodobenzoylamino-2-(4'-thiazolyl)benzimidazole

Following the procedure of Example 21 and substituting 7.2 g. of m-iodobenzoyl chloride for the propionyl chloride, there is obtained 5-m-iodobenzoylamino-2-(4'-thiazolyl)benzimidazole, M.P. 127–129° C.

EXAMPLE 37

5-m-trifluoromethylbenzoylamino-2-(4'-thiazolyl)benzimidazole

Following the the procedure of Example 21 and substituting 4.22 g. of m-trifluoromethylbenzoyl chloride for the propionyl chloride, there is obtained 5-m-trifluoromethylbenzoylamino-2-(4'-thiazolyl)benzimidazole, M.P. 210–203° C.

EXAMPLE 38

5-m-nitrobenzoylamino-2-(4'-thiazolyl)benzimidazole

Following the procedure of Example 21 and substituting 3.9 g. of m-nitrobenzoyl chloride for the propionyl chloride, there is obtained 5-m-nitrobenzoylamino-2-(4'-thiazolyl)benzimidazole, M.P. 163–164° C.

EXAMPLE 39

5-(2,5-difluorobenzoyl)amino-2-(4'-thiazolyl)benzimidazole

Following the procedure of Example 21 and substituting 3.9 g. of 2,5-difluorobenzoyl chloride for the propionyl chloride, there is obtained 5-(2,5-difluorobenzoyl)amino-2-(4'-thiazolyl)benzimidazole, M.P. 113–114° C.

EXAMPLE 40

5-picolinylamino-2-(4'-thiazolyl)benzimidazole

Following the procedure of Example 21 and substituting 4.2 g. of picolinyl chloride hydrochloride for the propionyl chloride, there is obtained 5-picolinylamino-2-(4'-thiazolyl)benzimidazole, M.P. 240–241° C.

EXAMPLE 41

5-isonicotinylamino-2-(4'-thiazolyl)benzimidazole

Following the procedure of Example 21 and substituting 5 g. of isonicotinyl chloride hydrochloride for the propionyl chloride, there is obtained 5-isonicotinylamino-2-(4'-thiazolyl)benzimidazole, M.P. 150–153° C.

EXAMPLE 42

5-pivaloylamino-2-(4'-thiazolyl)benzimidazole

Following the procedure of Example 23 and substituting 4.10 g. of pivalic anhydride for the nicotinic anhydride, there is obtained 5-pivaloylamino-2-(4'-thiazolyl)benzimidazole, M.P. 241–242° C.

EXAMPLE 43

5-(2-furoyl)amino-2-(4'-thiazolyl)benzimidazole

Following the procedure of Example 23 and substituting 4.4 g. of 2-furoic anhydride for the nicotinic anhydride, there is obtained 5-(2-furoyl)amino-2-(4'-thiazolyl)benzimidazole, M.P. 139–140° C.

EXAMPLE 44

5-(4'-thiazolyl)carbonylamino-2-(4'-thiazolyl)benzimidazole

The procedure of Example 21 is repeated using 3.1 g. of thiazole-4-carboxylic acid chloride in place of propionyl chloride to afford 5-(4'-thiazolyl)-carbonylamino-2-(4'-thiazolyl)benzimidazole, M.P. 387–388° C.

EXAMPLE 45

5-(2-thienyl)-carbonylamino-2-(4'-thiazolyl)benzimidazole

When the procedure of Example 21 is repeated using 5 g. of thenoic acid anhydride in place of propionyl chloride there is obtained 5-(2-thienyl)carbonylamino-2-(4'-thiazolyl)benzimidazole, M.P. 288° C. (d).

EXAMPLE 46

5-methoxyacetylamino-2-(4'-thiazolyl)benzimidazole

Following the procedure of Example 21 and substituting 2.3 g. of methoxyacetyl chloride for the propionyl chloride, there is obtained 5-methoxyacetylamino2-(4'-thiazolyl)-benzimidazole, M.P. 238–239° C.

EXAMPLE 47

5-dichloroacetylamino-2-(4'-thiazolyl)benzimidazole

Following the procedure of Example 21 and substituting 3.68 g. of dichloroacetyl chloride for the propionyl chloride, there is obtained 5-dichloroacetylamino-2-(4'-thiazolyl)benzimidazole, M.P. 220° C.

EXAMPLE 48

5-(3,3-dimethylacryloyl)amino-2-(4'-thiazolyl)benzimidazole

Following the procedure of Example 21 and substituting 3.55 g. of 3,3-dimethylacryloyl chloride for the propionyl chloride, there is obtained 5-(3,3-dimethylacryloyl)amino-2-(4'-thiazolyl)benzimidazole, M.P. 270–272° C.

EXAMPLE 49

5-(2,2,2-trifluoroethoxy)-carbonylamino-2-(4'-thiazolyl)benzimidazole

A mixture of 5 g. of 5-ethylthiolcarbonylamino-2-(4'-thiazolyl)benzimidazole and 0.5 g. of dibutyltinoxide in 50 ml. of 2,2,2-trifluoroethanol is refluxed for 20 hours. The solvent is evaporated and the residue is crystallized from a mixture of ethyl acetate and hexane to give the title compound, M.P. 231–232° C.

EXAMPLE 50

5-(2-propynyloxy)-carbonylamino-2-(4'-thiazolyl)benzimidazole

When the procedure of Example 49 is repeated employing 4 g. of the 5-ethylthiolcarbonylamino-2-(4'-thiazolyl)benzimidazole; 0.4 g. of the dibutyltinoxide and substituting 25 ml. of 2-propyn-1-ol for the 2,2,2,-trifluoroethanol, there is obtained 5-(2-propynyloxy)carbonylamino-2-(4'-thiazolyl)benzimidazole, M.P. 200–202° C.

EXAMPLE 51

5-phenoxythiocarbonylamino-2-(4'-thiazolyl)-benzimidazole 3.62 g. of phenoxythiocarbonyl chloride is added dropwise to a stirred suspension of 4.32 g. of 5-amino-2-(4'-thiazolyl)-benzimidazole in 25 ml. of pyridine. After stirring for 1.5 hours, water is added, and the solid which separates is collected and crystallized from methanol to give the title compound, M.P. 155–157° C.

EXAMPLE 52

5-isothiocyanato-2-(4'-thiazolyl-)-benzimidazole 7.2 g. of 5-phenoxythiocarbonylamino-2-(4'-thiazolyl)-benzimidazole is dissolved in 50 ml. of pyridine and heated for one hour at 100° C. Addition of water to the solution precipitates 5 - isothiocyanato - 2-(4'-thiazolyl)-benzmidazole, M.P. 243–246° C.

EXAMPLE 53

5-methoxythiocarbonylamino-2-(4'-thiazolyl)-benzimidazole

A solution of 2.5 g. of 5-isothiocyanato-2-(4'-thiazolyl)-benzimidazole and 25 mg. of sodium methoxide in 300 ml. of methanol is refluxed for 20 hours. Evaporation of the solvent followed by recrystallization of the residue from methanol gives 5-methoxythiocarbonylamino-2-(4'-thiazolyl)-benzimidazole, M.P. 224° C.

EXAMPLE 54

5-ethoxythiocarbonylamino-2-(4'thiazolyl)-benzimidazole

When the procedure of Example 53 is repeated using ethanol in place of methanol, the title compound is obtained, M.P. 218° C.

EXAMPLE 55

5-methylthiolthiocarbonylamino-2-(4'-thiazolyl)-benzimidazole

A slow stream of methyl mercaptan is passed into a solution of 4 g. of 5-isothiocyanato-2-(4'-thiazolyl)-benzimidazole in 25 ml. of dimethylformamide for 15 minutes. The solution is allowed to stand at room temperature for twenty hours and then water is added to precipitate 5-methylthiolthiocarbonylamino - 2-(4' - thiazolyl) - benzimidazole, M.P. 202–205° C.

EXAMPLE 56

5-thiobenzoylamino-2-(4'-thiazolyl)-benzimidazole

A mixture of 1 g. of 5-benzoylamino-2-(4'-thiazolyl)-benzimidazole, 2 g. of phosphorus pentasulfide and 20 ml. of pyridine is refluxed for 25 minutes. The solution is poured onto ice and the product which separates is purified by column chromatography through silica using chloroform as the eluent. Crystallization from methanol gives the title compound, M.P. 140–143° C.

EXAMPLE 57

5-(3-methylureido)-2-(4'thiazolyl)-benzimidazole 1.2 g. of methyl isocyanate is added dropwise with stirring to a suspension of 5-amino-2-(4'-thiazolyl)-benzimidazole in 25 ml. of pyridine. After stirring for 2.5 hours, water is added and the solid which separates is filtered off and crystallized from ethanol to give 5-(3-methylureido) - 2 - (4' - thiazolyl)-benzimidazole, M.P. 160° C.

EXAMPLE 58

5-(3,3-dimethylureido)-2-(4'-thiazolyl)-benzimidazole 2.5 g. of dimethylcarbamyl chloride is added dropwise with stirring to a suspension of 4.32 g. of 5-amino-2-(4'-thiazolyl)-benzimidazole in 25 ml. of pyridine. After stirring for 1.5 hours, water is added, and the solid which separates is collected and crystallized from methanol to give the title compound, M.P. 260–262° C.

EXAMPLE 59

5-(3,3-diethylureido)-2-(4'-thiazolyl)-benzimidazole

A mixture of 5 g. of 5-ethylthiolcarbonylamino-2-(4'-thiazolyl)-benzimidazole and 25 ml. of diethylamine is refluxed for one hour. Evaporation to an oil followed by addition of water precipitates a solid which is crystallized from chloroform to give 5 - (3,3 - diethylureido)-2-(4'-thiazolyl)-benzimidazole, M.P. 234–235° C.

EXAMPLE 60

5-(1-pyrrolidinyl)-carbonylamino-2-(4'-thiazolyl)-benzimidazole

When the procedure of Example 59 is repeated using 25 ml. of pyrrolidine in place of diethylamine, the title compound is obtained, M.P. 296–298° C.

EXAMPLE 61

5-(1-piperidinyl)-carbonylamino-2-(4'-triazolyl)-benzimidazole

When the procedure of Example 59 is repeated using 25 ml. of piperidine in place of diethylamine, the title compound is obtained.

EXAMPLE 62

5-(3-methylthioureido)-2-(4'-thiazolyl)-benzimidazole 1.6 g. of methyl isothiocyanate is added dropwise with stirring to a suspension of 4.32 g. of 5-amino-2-(4'-thiazolyl)-benzimidazole in 25 ml. of pyridine. After stirring for two hours, water is added to precipitate a solid which is collected and crystallized from a mixture of dimethylformamide and water to give 5-(3-methylthioureido) - 2-(4'-thiazolyl)-benzimidazole, M.P. 235–237° C.

EXAMPLE 63

5-(3-phenylthioureido)-2-(4'-thiazolyl)-benzimidazole

When the procedure of Example 62 is repeated using 2.9 g. of phenylisothiocyanate in place of methyl isothiocyanate, the title compound is obtained, M.P. 244–246° C.

EXAMPLE 64

5-(3,3-dimethylthioureido)-2-(4'-thiazolyl)-benzimidazole

A mixture of 3 g. of 5-isothiocyanato-2-(4'-thiazoyly)-benzimidazole and 100 ml. of 40% aqueous diethylamine is stirred at room temperature for five hours. The solid portion is collected and recrystallized from methanol to give the title compound, M.P. 156–159° C.

EXAMPLE 65

5-(3,3-diethylthioureido -2-(4'-thiazolyl)-benzimidazole

A solution of 4 g. of 5-isothiocyanato-2-(4'-thiazolyl)-benzimidazole and 30 ml. of diethylamine in 50 ml. of ethanol is refluxed for one hour. Evaporation and addition of water gives a solid which is recrystallized from a mixture of methanol, ether and petroleum benzin to give 5-(3,3 - diethylthioureido)-2-(4'-thiazolyl)-benzimidazole, M.P. 130–135° C.

EXAMPLE 66

5-(3-cyclopentylene-2-thioureido)-2-(4'-thiazolyl)-benzimidazole

When the procedure of Example 65 is repeated using 25 ml. of piperidine in place of the diethylamine (recrystallization of crude from a mixture of dimethylformamide and water), the title product is obtained, M.P. 225–226° C.

EXAMPLE 67

5-(3-cyclobutylene-2-thioureido)-2-(4'-thiazolyl)-benzimidazole

When the procedure of Example 65 is repeated using 25 ml. of pyrrolidine in place of the diethylamine, the title compound is obtained, M.P. 257–258° C.

EXAMPLE 68

5-isopropoxycarbonylamino-1-methyl-2-(4'-thiazolyl)-benzimidazole

To 8.5 g. of 5-isopropoxycarbonylamino-2-(4'-thiazolyl)-benzimidazole in 100 ml. of dry dimethylformamide is added 2.3 g. of a 52% sodium hydroxide emulsion in mineral oil. The mixture is stirred at room temperature for about twenty minutes and then warmed carefully to about 50° C. for ten minutes. It is cooled to room temperature and 7.1 g. of methyl iodide in 10 ml. of dimethylformamide is added slowly to the cooled solution. The reaction mixture is then heated to about 80° C. for 20 minutes, cooled, diluted with 200 ml. of water and extracted with three 100 ml. portions of ether. The ether extracts are combined, washed with water, dried over sodium sulfate. filtered, and the ether removed in vacuo to give the title compound which is purified by recrystallization from ethyl acetate.

By substituting equivalent quantities of propyl chloride, phenylethyl chloride, benzyl bromide, isopropyl chloride, or acetyl chloride for the methyl iodide in the above reaction, there are obtained, respectively, the corresponding 1-propyl, 1-phenethyl, 1-benzyl, 1-isopropyl, and 1-acetyl-benzimidazole.

EXAMPLE 69

5-isopropoxycarbonylamino-1-methoxy-2-(4'-thiazolyl)-benzimidazole (A) 5-nitro-1-methoxy-2-(4'-thiazolyl)-benzimidazole.—A mixture of 1.30 ml. of concentrated nitric acid (spg. 1.41) in 2.80 ml. of concentrated sulfuric acid (spg. 1.84) is added dropwise to a cold solution of 3.80 g. of 1-methoxy-2-(4'-thiazolyl)-benzimidazole in 12.3 ml. of concentrated sulfuric acid. The reaction temperature is maintained at 12°±2° during addition by external cooling. The reaction mixture is stirred at room temperature for 30 minutes, then poured onto an ice water mixture. The pH of the suspension is adjusted to pH 8. The yellow solids are collected by filtration and washed with water and cold methanol. Recrystallization from methanol yields 1.5 g. of purified product, M.P. 220–221° C.

(B) 5-amino-1-methoxy-2-(4'-thiazolyl)-benzimidazole·HCl.—A suspension of 0.5 g. of 1-methoxy-2-(4-thiazolyl)-5-nitrobenzimidazole in 400 ml. of absolute ethanol is reduced using 1 g. of 10% palladium on carbon at room temperature in a hydrogen atmosphere at 40 lbs. p.s.i. When uptake of hydrogen is complete, the catalyst is removed by filtration and the filtrate is treated with 2.0 ml. of a 2.5 N methanolic hydrogen chloride solution. The solvent is removed in vacuo to yield 450 mg. of amorphous product which is carried into the next step.

(C) 5-isopropoxycarbonylamino-1-methoxy-2-(4'-thiazolyl)-benzimidazole.—A solution of the above hydrochloride salt in 15 ml. of pyridine is treated dropwise with 0.24 ml. of isopropyl chloroformate at room temperature. After stirring for 16 hours, the reaction mixture is diluted with 150 ml. of water and extracted with chloroform. The chloroform extracts are washed with water, dried over magnesium sulfate, filtered, and evaporated in vacuo. The oily residue is dissolved in chloroform and passed over a column of silica gel. Elution with a 5% methanol-95% chloroform mixture yields purified product. Recrystallization from ether-hexane mixture yields pure product, M.P. 123–125° C.

EXAMPLE 70

5-isopropoxycarbonylamino-1-carboxymethoxy-2-(4'-thiazolyl)-benzimidazole

When the procedure of Example 69 is repeated using 1-carboxymethoxy-2-(4'-thiazolyl)-benzimidazole in Step A in place of 1-methoxy-2-(4'-thiazolyl)-benzimidazole, there is obtained the title compound.

EXAMPLE 71

5-isopropoxycarbonylamino-1-hydroxy-2-(4'-thiazolyl)-benzimidazole

When the process of Example 69 is repeated using 1-hydroxy-2-(4'-thiazolyl)-benzimidazole in place of 1-methoxy-2-(4'-thiazolyl)-benzimidazole in Step A and carrying out the reduction of Step B in glacial acetic acid instead of absolute ethanol, the title product is obtained.

EXAMPLE 72

1-acetyl-5-methoxycarbonylamino-2-(4'-thiazolyl)-benzimidazole 5.4 g. of 5-methoxycarbonylamino-2-(4'-thiazolyl)-benzimidazole is added to a mixture of 100 ml. of toluene and 30 ml. of dimethyl formamide. The mixture is distilled to remove 5 ml. of toluene and then 0.7 g. of sodium hydride in 2 ml. of toluene are added at about 65° C. The mixture is then stirred for one hour at this temperature and 2.5 g. of acetyl chloride added dropwise at 55° C. The resulting mixture is refluxed for 30 minutes, chilled and 2 ml. of water added to it. It is then washed with 5% aqueous sodium bicarbonate, filtered and evaporated to dryness in vacuo to afford a residue of 1-acetyl-5-methoxycarbonylamino-2-(4'-thiazolyl)-benzimidazole.

Repeating this procedure with 3 g. of benzoyl chloride in place of the acetyl chloride affords 1-benzoyl-5-methoxycarbonylamino-2-(4'-thiazolyl)-benzimidazole.

EXAMPLE 73

5-isopropoxycarbonylamino-1-butylcarbamoyl-2-(4'-thiazolyl)-benzimidazole

A solution of 3.26 g. of 5-isopropylcarbonylamino-2-(4'-thiazolyl)-benzimidazole and 1 g. of n-butyl isocyanate in 100 ml. of dry acetonitrile is refluxed for four hours. The solvent is evaporated and the residue is extracted wtih chloroform. The product is isolated by chromatography of the chloroform extract through silica gel.

Similarly, by using methyl isocyanate, ethyl isocyanate or propyl isocyanate in the above procedure in place of the butyl isocyanate, the corresponding methylcarbamoyl, ethylcarbamoyl and propylcarbamoyl analogs can be obtained.

EXAMPLE 74

5-isopropoxycarbonylamino-1-isopropoxycarbonyl-2-(4'-thiazolyl)-benzimidazole 2.6 g. of isopropyl chloroformate is added dropwise to a mixture of 4.5 g. of 5-isopropoxycarbonylamino-2-(4'-thiazolyl)-benzimidazole in 20 ml. of dry pyridine, the addition being carried out at room temperature. The mixture is stirred at room temperature for another 90 minutes and then about 200 ml. of ice water are added. The resulting solid is separated by filtration and washed with water. It is dissolved in a minimum volume of methanol and the methanol solution is treated with decolorizing charcoal. The charcoal is filtered off and the clear solution is evaporated to a small volume. A small amount of water is added to induce crystallization. The product is separated and dried.

EXAMPLE 75

5-methylsulfonylamino-2-(4'-thiazolyl)-benzimidazole 2.29 g. of methanesulfonyl charcoal is added dropwise at room temperature to a stirred mixture of 4.32 g. of 5-amino-2-(4'-thiazolyl)-benzimidazole in 20 ml. of pyridine. The mixture is then stirred for one hour and at the end of this time 100 ml. of water is added. The resulting solid product is separated and recrystallized twice from methanol to afford 5-methylsulfonylamino-2-(4'-thiazolyl)-benzimidazole, M.P. 225–226° C.

When the procedure of above is repeated using 3.53 g. of benzenesulfonyl chloride, there is obtained 5-benzenesulfonylamino-2-(4'-thiazolyl)benzimidazole, M.P. 254–255° C.

EXAMPLE 76

5-N-methylmethoxycarbonylamino-2-(4'-thiazolyl)-benzimidazole (A) 5-N-methylbenzenesulfonylamino-2-(4'-thiazolyl)benzimidazole.—0.625 ml. of methyl iodide is added

EXAMPLE 52

5-isothiocyanato-2-(4'-thiazolyl-)-benzimidazole 7.2 g. of 5-phenoxythiocarbonylamino-2-(4'-thiazolyl)-benzimidazole is dissolved in 50 ml. of pyridine and heated for one hour at 100° C. Addition of water to the solution precipitates 5 - isothiocyanato - 2-(4'-thiazolyl)-benzmidazole, M.P. 243–246° C.

EXAMPLE 53

5-methoxythiocarbonylamino-2-(4'-thiazolyl)-benzimidazole

A solution of 2.5 g. of 5-isothiocyanato-2-(4'-thiazolyl)-benzimidazole and 25 mg. of sodium methoxide in 300 ml. of methanol is refluxed for 20 hours. Evaporation of the solvent followed by recrystallization of the residue from methanol gives 5-methoxythiocarbonylamino-2-(4'-thiazolyl)-benzimidazole, M.P. 224° C.

EXAMPLE 54

5-ethoxythiocarbonylamino-2-(4'thiazolyl)-benzimidazole

When the procedure of Example 53 is repeated using ethanol in place of methanol, the title compound is obtained, M.P. 218° C.

EXAMPLE 55

5-methylthiolthiocarbonylamino-2-(4'-thiazolyl)-benzimidazole

A slow stream of methyl mercaptan is passed into a solution of 4 g. of 5-isothiocyanato-2-(4'-thiazolyl)-benzimidazole in 25 ml. of dimethylformamide for 15 minutes. The solution is allowed to stand at room temperature for twenty hours and then water is added to precipitate 5-methylthiolthiocarbonylamino - 2-(4' - thiazolyl) - benzimidazole, M.P. 202–205° C.

EXAMPLE 56

5-thiobenzoylamino-2-(4'-thiazolyl)-benzimidazole

A mixture of 1 g. of 5-benzoylamino-2-(4'-thiazolyl)-benzimidazole, 2 g. of phosphorus pentasulfide and 20 ml. of pyridine is refluxed for 25 minutes. The solution is poured onto ice and the product which separates is purified by column chromatography through silica using chloroform as the eluent. Crystallization from methanol gives the title compound, M.P. 140–143° C.

EXAMPLE 57

5-(3-methylureido)-2-(4'thiazolyl)-benzimidazole 1.2 g. of methyl isocyanate is added dropwise with stirring to a suspension of 5-amino-2-(4'-thiazolyl)-benzimidazole in 25 ml. of pyridine. After stirring for 2.5 hours, water is added and the solid which separates is filtered off and crystallized from ethanol to give 5-(3-methylureido) - 2 - (4' - thiazolyl)-benzimidazole, M.P. 160° C.

EXAMPLE 58

5-(3,3-dimethylureido)-2-(4'-thiazolyl)-benzimidazole 2.5 g. of dimethylcarbamyl chloride is added dropwise with stirring to a suspension of 4.32 g. of 5-amino-2-(4'-thiazolyl)-benzimidazole in 25 ml. of pyridine. After stirring for 1.5 hours, water is added, and the solid which separates is collected and crystallized from methanol to give the title compound, M.P. 260–262° C.

EXAMPLE 59

5-(3,3-diethylureido)-2-(4'-thiazolyl)-benzimidazole

A mixture of 5 g. of 5-ethylthiolcarbonylamino-2-(4'-thiazolyl)-benzimidazole and 25 ml. of diethylamine is refluxed for one hour. Evaporation to an oil followed by addition of water precipitates a solid which is crystallized from chloroform to give 5 - (3,3 - diethylureido)-2-(4'-thiazolyl)-benzimidazole, M.P. 234–235° C.

EXAMPLE 60

5-(1-pyrrolidinyl)-carbonylamino-2-(4'-thiazolyl)-benzimidazole

When the procedure of Example 59 is repeated using 25 ml. of pyrrolidine in place of diethylamine, the title compound is obtained, M.P. 296–298° C.

EXAMPLE 61

5-(1-piperidinyl)-carbonylamino-2-(4'-triazolyl)-benzimidazole

When the procedure of Example 59 is repeated using 25 ml. of piperidine in place of diethylamine, the title compound is obtained.

EXAMPLE 62

5-(3-methylthioureido)-2-(4'-thiazolyl)-benzimidazole 1.6 g. of methyl isothiocyanate is added dropwise with stirring to a suspension of 4.32 g. of 5-amino-2-(4'-thiazolyl)-benzimidazole in 25 ml. of pyridine. After stirring for two hours, water is added to precipitate a solid which is collected and crystallized from a mixture of dimethylformamide and water to give 5-(3-methylthioureido) - 2-(4'-thiazolyl)-benzimidazole, M.P. 235–237° C.

EXAMPLE 63

5-(3-phenylthioureido)-2-(4'-thiazolyl)-benzimidazole

When the procedure of Example 62 is repeated using 2.9 g. of phenylisothiocyanate in place of methyl isothiocyanate, the title compound is obtained, M.P. 244–246° C.

EXAMPLE 64

5-(3,3-dimethylthioureido)-2-(4'-thiazolyl)-benzimidazole

A mixture of 3 g. of 5-isothiocyanato-2-(4'-thiazoyly)-benzimidazole and 100 ml. of 40% aqueous diethylamine is stirred at room temperature for five hours. The solid portion is collected and recrystallized from methanol to give the title compound, M.P. 156–159° C.

EXAMPLE 65

5-(3,3-diethylthioureido-2-(4'-thiazolyl)-benzimidazole

A solution of 4 g. of 5-isothiocyanato-2-(4'-thiazolyl)-benzimidazole and 30 ml. of diethylamine in 50 ml. of ethanol is refluxed for one hour. Evaporation and addition of water gives a solid which is recrystallized from a mixture of methanol, ether and petroleum benzin to give 5-(3,3 - diethylthioureido)-2-(4'-thiazolyl)-benzimidazole, M.P. 130–135° C.

EXAMPLE 66

5-(3-cyclopentylene-2-thioureido)-2-(4'-thiazolyl)-benzimidazole

When the procedure of Example 65 is repeated using 25 ml. of piperidine in place of the diethylamine (recrystallization of crude from a mixture of dimethylformamide and water), the title product is obtained, M.P. 225–226° C.

EXAMPLE 67

5-(3-cyclobutylene-2-thioureido)-2-(4'-thiazolyl)-benzimidazole

When the procedure of Example 65 is repeated using 25 ml. of pyrrolidine in place of the diethylamine, the title compound is obtained, M.P. 257–258° C.

EXAMPLE 68

5-isopropoxycarbonylamino-1-methyl-2-(4'-thiazolyl)-benzimidazole

To 8.5 g. of 5-isopropoxycarbonylamino-2-(4'-thiazolyl)-benzimidazole in 100 ml. of dry dimethylformamide is added 2.3 g. of a 52% sodium hydroxide emulsion in mineral oil. The mixture is stirred at room temperature for about twenty minutes and then warmed carefully to about 50° C. for ten minutes. It is cooled to room temperature and 7.1 g. of methyl iodide in 10 ml. of dimethylformamide is added slowly to the cooled solution. The reaction mixture is then heated to about 80° C. for 20 minutes, cooled, diluted with 200 ml. of water and extracted with three 100 ml. portions of ether. The ether extracts are combined, washed with water, dried over sodium sulfate. filtered, and the ether removed in vacuo to give the title compound which is purified by recrystallization from ethyl acetate.

By substituting equivalent quantities of propyl chloride, phenylethyl chloride, benzyl bromide, isopropyl chloride, or acetyl chloride for the methyl iodide in the above reaction, there are obtained, respectively, the corresponding 1-propyl, 1-phenethyl, 1-benzyl, 1-isopropyl, and 1-acetyl-benzimidazole.

EXAMPLE 69

5-isopropoxycarbonylamino-1-methoxy-2-(4′-thiazolyl)-benzimidazole (A) 5-nitro-1-methoxy - 2 - (4′ - thiazolyl)-benzimidazole.—A mixture of 1.30 ml. of concentrated nitric acid (spg. 1.41) in 2.80 ml. of concentrated sulfuric acid (spg. 1.84) is added dropwise to a cold solution of 3.80 g. of 1-methoxy-2-(4′-thiazolyl)-benzimidazole in 12.3 ml. of concentrated sulfuric acid. The reaction temperature is maintained at 12°±2° during addition by external cooling. The reaction mixture is stirred at room temperature for 30 minutes, then poured onto an ice water mixture. The pH of the suspension is adjusted to pH 8. The yellow solids are collected by filtration and washed with water and cold methanol. Recrystallization from methanol yields 1.5 g. of purified product, M.P. 220–221° C.

(B) 5-amino-1-methoxy - 2 - (4′-thiazolyl)-benzimidazole·HCl.—A suspension of 0.5 g. of 1-methoxy-2-(4′-thiazolyl) - 5 - nitrobenzimidazole in 400 ml. of absolute ethanol is reduced using 1 g. of 10% palladium on carbon at room temperature in a hydrogen atmosphere at 40 lbs. p.s.i. When uptake of hydrogen is complete, the catalyst is removed by filtration and the filtrate is treated with 2.0 ml. of a 2.5 N methanolic hydrogen chloride solution. The solvent is removed in vacuo to yield 450 mg. of amorphous product which is carried into the next step.

(C) 5-isopropoxycarbonylamino - 1 - methoxy-2-(4′-thiazolyl)-benzimidazole.—A solution of the above hydrochloride salt in 15 ml. of pyridine is treated dropwise with 0.24 ml. of isopropyl chloroformate at room temperature. After stirring for 16 hours, the reaction mixture is diluted with 150 ml. of water and extracted with chloroform. The chloroform extracts are washed with water, dried over magnesium sulfate, filtered, and evaporated in vacuo. The oily residue is dissolved in chloroform and passed over a column of silica gel. Elution with a 5% methanol-95% chloroform mixture yields purified product. Recrystallization from ether-hexane mixture yields pure product, M.P. 123–125° C.

EXAMPLE 70

5-isopropoxycarbonylamino-1-carboxymethoxy-2-(4′-thiazolyl)-benzimidazole

When the procedure of Example 69 is repeated using 1-carboxymethoxy-2-(4′-thiazolyl)-benzimidazole in Step A in place of 1-methoxy-2-(4′-thiazolyl)-benzimidazole, there is obtained the title compound.

EXAMPLE 71

5-isopropoxycarbonylamino-1-hydroxy-2-(4′-thiazolyl)-benzimidazole

When the process of Example 69 is repeated using 1-hydroxy-2-(4′-thiazolyl) - benzimidazole in place of 1-methoxy-2-(4′-thiazolyl)-benzimidazole in Step A and carrying out the reduction of Step B in glacial acetic acid instead of absolute ethanol, the title product is obtained.

EXAMPLE 72

1-acetyl-5-methoxycarbonylamino-2-(4′-thiazolyl)-benzimidazole 5.4 g. of 5-methoxycarbonylamino - 2 - (4′-thiazolyl)-benzimidazole is added to a mixture of 100 ml. of toluene and 30 ml. of dimethyl formamide. The mixture is distilled to remove 5 ml. of toluene and then 0.7 g. of sodium hydride in 2 ml. of toluene are added at about 65° C. The mixture is then stirred for one hour at this temperature and 2.5 g. of acetyl chloride added dropwise at 55° C. The resulting mixture is refluxed for 30 minutes, chilled and 2 ml. of water added to it. It is then washed with 5% aqueous sodium bicarbonate, filtered and evaporated to dryness in vacuo to afford a residue of 1-acetyl-5-methoxycarbonylamino-2-(4′-thiazolyl)-benzimidazole.

Repeating this procedure with 3 g. of benzoyl chloride in place of the acetyl chloride affords 1-benzoyl-5-methoxycarbonylamino-2-(4′-thiazolyl)-benzimidazole.

EXAMPLE 73

5-isopropoxycarbonylamino-1-butylcarbamoyl-2-(4′-thiazolyl)-benzimidazole

A solution of 3.26 g. of 5-isopropylcarbonylamino-2-(4′-thiazolyl)-benzimidazole and 1 g. of n-butyl isocyanate in 100 ml. of dry acetonitrile is refluxed for four hours. The solvent is evaporated and the residue is extracted wtih chloroform. The product is isolated by chromatography of the chloroform extract through silica gel.

Similarly, by using methyl isocyanate, ethyl isocyanate or propyl isocyanate in the above procedure in place of the butyl isocyanate, the corresponding methylcarbamoyl, ethylcarbamoyl and propylcarbamoyl analogs can be obtained.

EXAMPLE 74

5-isopropoxycarbonylamino-1-isopropoxycarbonyl-2-(4′-thiazolyl)-benzimidazole 2.6 g. of isopropyl chloroformate is added dropwise to a mixture of 4.5 g. of 5-isopropoxycarbonylamino - 2 - (4′-thiazolyl)-benzimidazole in 20 ml. of dry pyridine, the addition being carried out at room temperature. The mixture is stirred at room temperature for another 90 minutes and then about 200 ml. of ice water are added. The resulting solid is separated by filtration and washed with water. It is dissolved in a minimum volume of methanol and the methanol solution is treated with decolorizing charcoal. The charcoal is filtered off and the clear solution is evaporated to a small volume. A small amount of water is added to induce crystallization. The product is separated and dried.

EXAMPLE 75

5-methylsulfonylamino-2-(4′-thiazolyl)-benzimidazole 2.29 g. of methanesulfonyl charcoal is added dropwise at room temperature to a stirred mixture of 4.32 g. of 5-amino-2-(4′-thiazolyl)-benzimidazole in 20 ml. of pyridine. The mixture is then stirred for one hour and at the end of this time 100 ml. of water is added. The resulting solid product is separated and recrystallized twice from methanol to afford 5-methylsulfonylamino - 2 - (4′ - thiazolyl)-benzimidazole, M.P. 225–226° C.

When the procedure of above is repeated using 3.53 g. of benzenesulfonyl chloride, there is obtained 5-benzenesulfonylamino-2-(4′-thiazolyl)benzimidazole, M.P. 254–255° C.

EXAMPLE 76

5-N-methylmethoxycarbonylamino-2-(4′-thiazolyl)-benzimidazole (A) 5 - N - methylbenzenesulfonylamino - 2 - (4′-thiazolyl)benzimidazole.—0.625 ml. of methyl iodide is added to a mixture of 3.5 g. of 5-benzenesulfonylamino-2-(4'-thiazolyl)-benzimidazole and 0.54 g. of sodium methoxide in 10 ml. of methanol. After 24 hours, water is added to precipitate a solid which is collected and crystallized from methanol to give 5-N-methylbenzenesulfonylamino-2-(4'-thiazolyl)-benzimidazole, M.P. 142–143° C.

(B) 5-methylamino - 2 - (4'-thiazolyl)benzimidazole.—A solution of 4 g. of 5-N-methylbenzenesulfonylamino-2-(4'-thiazolyl)benzimidazole in 100 ml. of concentrated hydrochloric acid is refluxed for 3 hours. Evaporation of the excess of acid followed by basification gives a solid precipitate which is filtered off and crystallized from acetonitrile to give 5-methylamino-2-(4'-thiazolyl)benzimidazole, M.P. 192–193° C.

(C) 5-N-methylmethoxycarbonylamino - 2 - (4' - thiazolyl)-benzimidazole.—0.41 ml. of methyl chloroformate is added dropwise with stirring to a suspension of 1.15 g. of 5-methylamino-2-(4'-thiazolyl)benzimidazole in 5 ml. of pyridine. After stirring for 1 hour at room temperature water is added to precipitate a gum which is extracted with methylene chloride. Evaporation of the solvent followed by crystallization of the residue from a mixture of ether and petroleum benzene gives 5-N-methbenzimidazole for the 5-amino-2-(4'-thiazolyl) benzimid-M.P. 161–162° C.

EXAMPLE 77

5-methoxycarbonylamino-2-(2'-furyl)-benzimidazole

Following the procedure of Example 1 and substituting an equivalent molar quantity of 5-amino-2-(2'-furyl-benzimidazole for the 5-amino-2-(4'-thiazolyl)-benzimidazole, the title compound is obtained, M.P. 162–163° C.

EXAMPLE 78

5-methoxycarbonylamino-1-methoxycarbonyl-2-(2'-furyl)benzimidazole

Following the procedure of Example 1 and substituting an equivalent molar quantity of 5-amino-1-methoxycarbonyl-2-(2'-furyl) benzimidazole for the 5-amino-2-(4'-thiazolyl) benzimidazole, the title compound is obtained, M.P. 164° C.

EXAMPLE 79

5-ethoxycarbonylamino-2-(2'-furyl) benzimidazole

Following the procedure of Example 3 and substituting an equivalent molar quantity of 5-amino-2-(2'-furyl) benzimidazole for the 5-amino-2-(4'-thiazolyl) benzimidazole, the title product is obtained, M.P. 171–172° C.

EXAMPLE 80

5-phenoxycarbonylamino-2-(2'-furyl) benzimidazole

Following the procedure of Example 9 and substituting an equivalent molar quantity of 5-amino-2-(2'-furyl) benzimidazole for the 5-amino-2-(4'-thiazolyl) benzimidazole, the title product is obtained, M.P. 150–155° C.

EXAMPLE 81

5-ethoxycarbonylamino-2-(2'-pyrryl) benzimidazole

Following the procedure of Example 3 and substituting an equivalent molar quantity of 5-amino-2-(2'-pyrryl) benzimidazole for the 5-amino-2-(4'-thiazolyl)benzimidazole, there is obtained the title compound, M.P. 200–202° C.

EXAMPLE 82

5-methoxycarbonylamino-2-(2'-thienyl) benzimidazole

Following the procedure of Example 2 and substituting an equivalent molar quantity of 5-amino-2-(2'-thienyl) benzimidazole for the 5-amino-2-(4'-thiazolyl)benzimidazole, there is obtained the title compound, M.P. 185–188° C.

EXAMPLE 83

5-methoxycarbonylamino-2-[3'-(1',2',5'-thiadiazolyl)]-benzimidazole

Following the procedure of Example 1 and substituting an equivalent molar quantity of 5-amino-2-[3'-(1',2',5'-thiadiazolyl)]benzimidazole for the 5-amino-2-(4'-thiazolyl)-benzimidazole, the title compound is obtained, M.P. 150–155° C.

EXAMPLE 84

5-methoxycarbonylamino-2-(1'-pyrazolyl)benzimidazole

Following the procedure of Example 1 and substituting an equivalent molar quantity of 5-amino-2-(1'-pyrazolyl)-benzimidazole for the 5-amino - 2 - (4'-thiazolyl)-benzimidazole, the title compound is obtained, M.P. 207–210° C.

EXAMPLE 85

5-methoxycarbonylamino-2-(2'-methyl-4'-thiazolyl)benzimidazole

Following the procedure of Example 1 and substituting an equivalent molar quantity of 5-amino-2-(2'-methyl-4'-thiazolyl)-benzimidazole for the 5-amino-2-(4'-thiazolyl)-benzimidazole, the title compound is obtained, M.P. 135° C.

EXAMPLE 86

5-methoxycarbonylamino-2-[4'-(1',2',3'-thiadiazolyl)]-benzimidazole

Following the procedure of Example 1 and substituting an equivalent molar quantity of 5-amino-2-[4'-(1',2',3'-thiadiazolyl)-benzimidazole for the 5-amino-2-(4'-thiazolyl)-benzimidazole, the title product is obtained, M.P. 218–220° C.

EXAMPLE 87

5-methoxycarbonylamino-2-[2'-(1',3',4'-thiadiazolyl)]-benzimidazole

Following the procedure of Example 1 and substituting an equivalent molar quantity of 5-amino-2-[2'-(1',3',4'-thiadazolyl)]-benzimidazole for the 5-amino - 2 - (4'-thiazolyl)-benzimidazole, the title product is obtained, M.P. 258° C.

EXAMPLE 88

5-isopropoxycarbonylamino-2-(2'-oxazolyl)-benzimidazole

Following the procedure of Example 1 and substituting equivalent molar quantities of 5-amino-2-(2'-oxazolyl)-benzimidazole for the 5-amino-2-(4'-thiazolyl)-benzimidazole, and of isopropyl chloroformate for the methyl chloroformate, there is produced the title compound, M.P. 206° C.

EXAMPLE 89

5-isopropoxycarbonylamino-2-(2'-thiazolyl)-benzimidazole

Following the procedure of Example 1 and substituting equivalent molar quantities of 5-amino-2-(2'-thiazolyl)-benzimidazole for the 5-amino - 2 - (4'-thiazolyl)-benzimidazole, and of isopropyl chloroformate for the methyl chloroformate, the title compound is obtained, M.P. 234° C.

EXAMPLE 90

5-methoxycarbonylamino-2-(2'-imidazolyl)-benzimidazole

Following the procedure of Example 1 and substituting an equivalent molar quantity of 5-amino-2-(2'-imidazolyl)-benzimidazole for the 5-amino-2-(4'-thiazolyl)-benzimidazole, the title compound is obtained, M.P. 205–207° C.

EXAMPLE 91

5-p-fluorobenzolylamino-2-(2'-furyl)-benzimidazole

Following the procedure of Example 21 and substituting equivalent molar quantities of 5-amino-2-(2'-furyl)-benzimidazole for the 5-amino-2-(4'-thiazolyl)-benzimidazole, and of p-fluorobenzoyl chloride for the propionyl chloride, the title compound is obtained, M.P. 264° C.

EXAMPLE 92

5-(2-furyl)-carbonylamino-2-(2'-furyl)-benzimidazole

Following the procedure of Example 21 and substituting equivalent molar quantities of 5-amino-2-(2'-furyl)-benzimidazole for the 5-amino-2-(4'-thiazolyl)-benzimidazole, and of furyl-2-carbonyl chloride for the propionyl chloride, the title compound is obtained, M.P. 248° C.

EXAMPLE 93

5-p-fluorobenzoylamino-2-(1'-pyrazolyl)-benzimidazole

Following the procedure of Example 21 and substituting equivalent molar quantities of 5-amino-2-(1'-pyrazolyl)-benzimidazole for the 5-amino-2-(4'-thiazolyl)-benzimidazole, and of p-fluorobenzoyl chloride for the propionyl chloride, the title compound is obtained, M.P. 230° C.

EXAMPLE 94

5-benzoylamino-2-(2'-thiazolyl)-benzimidazole

Following the procedure of Example 21 and substituting equivalent molar quantities of 5-amino-2-(2'-thiazolyl)-benzimidazole for the 5-amino-2-(4'-thiazolyl)-benzimidazole, and of benzoyl chloride for the propionyl chloride, the title compound is obtained, M.P. 135–140° C.

EXAMPLE 95

5-isopropoxycarbonylamino-1-hydroxy-2-(4'-thiazolyl)-benzimidazole 6-isopropoxycarbonylamino-1-hydroxy-2-(4'-thiazolyl)-benzimidazole (A) 5 - nitro - 1 - hydroxy-2-(4'-thiazolyl)-benzimidazole; 6 - nitro - 1 - hydroxy - 2-(4'-thiazolyl)-benzimidazole.—A mixture of 1.30 ml. of concentrated nitric acid (sp. g. 1.41) in 2.80 ml. of concentrated sulfuric acid (sp. g. 1.84) is added dropwine to a cold solution of 3.80 g. of 1-hydroxy-2-(4'-thiazolyl)-benzimidazole in 12.3 ml. of concentrated sulfuric acid. The reaction temperature is maintained at 12°±2° during addition by external cooling. The reaction mixture is stirred at room temperature for 30 minutes, then poured onto an ice water mixture. The pH of the suspension is adjusted to pH 8. The yellow solids are collected by filtration and washed with water and cold methanol. The reaction product is then separated into the isomeric nitro-products, and each is recrystallized from methanol. Both purified products, 5-nitro - 1 - hydroxy-2-(4'-thiazolyl)-benzimidazole and 6-nitro - 1 - hydroxy-2-(4'-thiazolyl)-benzimidazole, are recovered.

(B) 5 - amino - 1 - hydroxy-2-(4'-thiazolyl)-benzimidazole·HCl; 6 - amino - 1-hydroxy-2-(4'-thiazolyl)-benzimidazole·HCl.—A suspension of 0.5 g. of 1-hydroxy-2-(4'-thiazolyl)-5-nitrobenzimidazole in 400 ml. of glacial acetic acid is reduced using 1 g. of 10% palladium on carbon at room temperature in a hydrogen atmosphere at 40 lbs. p.s.i. When uptake of hydrogen is complete, the catalyst is removed by filtration and the filtrate is treated with 2.0 ml. of a 2.5 N methanolic hydrogen chloride solution. The solvent is removed in vacuo to yield 450 mg. of amorphous product which is carried into the next step. In the same manner, 6-amino-1-hydroxy-2-(4'-thiazolyl)-benzimidazole·HCl is prepared using 1-hydroxy-2-(4'-thiazolyl)-6-nitrobenzimidazole.

(C) 5 - isopropoxycarbonylamino - 1 - hydroxy-2-(4'-thiazolyl) - benzimidazole; 6 - isopropoxycarbonylamino-1 - hydroxy - 2-(4'-thiazolyl)-benzimidazole.—A solution of the hydrochloride salt in 15 ml. of pyridine is treated dropwise with 0.24 ml. of isopropyl chloroformate at room temperature. After stirring for 16 hours, the reaction mixture is diluted with 150 ml. of water and extracted with chloroform. The chloroform extracts are washed with water, dried over magnesium sulfate, filtered, and evaporated in vacuo. The oily residue is dissolved in chloroform and passed over a column of silica gel. Elution with a 5% methanol-95% chloroform mixture yields purified product. Recrystallization from ether-hexane mixture yields pure product, 5-isopropoxycarbonylamino-1-hydroxy-2-(4'-thiazolyl)-benzimidazole. When the 6-isomer is employed in the reaction, 6-isopropoxycarbonylamino - 1 - hydroxy-2-(4'-thiazolyl)-benzimidazole is prepared.

EXAMPLE 96

5-isopropoxycarbonylamino-1-hydroxy-2-(4'-thiazolyl)-benzimidazole 204 g. of m-chloroaniline is added dropwise over 30 minutes to 196 g. of acetic anhydride in a 2 L. flask. The temperature of the reaction is maintained at 30° C. throughout the addition. 200 ml. of glacial acetic acid is then added, and the mixture is cooled to 5° C. 490 ml. of concentrated sulfuric acid is then added slowly. The temperature is not permitted to exceed 25° C., and is finally cooled to 10° C. 98 ml. of fuming nitric acid (sp. gr. 1.5) is then added over 80 minutes at 15° C. The reaction mixture is quenched by adding to 6 liters of crushed ice. A solid precipitates. This solid is hydrolyzed in 200 ml. of conc. HCl and 500 ml. of water, by refluxing for 1 hour. 15 ml. of conc. ammonium hydroxide is added to a basic pH. The solid which is precipitated is purified and recrystallized using ethyl alcohol. The final pure product is 3-chloro-4-nitroaniline, M.P. 161.5–163° C.

19.9 g. of 3-chloro-4-nitroaniline prepared above, 16.6 g. of 4-(aminomethyl)-thiazole, and 23.9 g. of potassium carbonate is stirred under $N_2$ at 125° C. for 3 hours. An additional 3.3 g. of 4-(aminomethyl)-thiazole is then added, and 25 ml. of dimethylformamide is added to the thick reaction mass. The mixture is quenched by adding to 250 ml. of water. When 25 ml. of hexane are added, a brown solid is formed. The product is filtered and purified, and 4-[N-(2-nitro-5-aminophenyl)aminomethyl]-thiazole, M.P. 165–166° C., is recovered.

8.1 ml. of isopropylchloroformate is added to a cooled slurry of 4-[N-(2-nitro-5-aminophenyl)aminomethyl]-thiazole in 90 ml. of pyridine. The temperature is maintained at 5–10° C. After warming to room temperature and stirring for 45 minutes, an additional 0.5 ml. of isopropylchloroformate is added to complete the reaction. The reaction mixture is then added to 1800 ml. of ice water to quench. A gum precipitates, which is filtered and purified. The product obtained is 4-[N-(2-nitro-5-isopropoxycarbonylaminophenyl)aminomethyl] - thiazole, M.P. 127–129° C.

A mixture of 18 g. of 4-[N-(2-nitro-5-isopropoxycarbonylaminophenyl)aminomethyl]-thiazole and 14 g. of solid NaOH in 720 ml. of isopropanol is stirred at 45° C. under $N_2$ for 5 hours. A sodium salt of the product starts to precipitate during the first hour of reaction. The product after purification is dissolved in water. The solution is filtered and acidified in the glacial acetic acid to pH 5. The precipitated product is purified by recrystallization, washed and dried. The product, 5-isoproxycarbonylamino-1-hydoxy-2 - (4' - thiazolyl) - benzimidazole, M.P. 166–169° C., dec., is obtained.

EXAMPLE 97

6-isopropoxycarbonylamino-1-hydroxy-2-(4'-thiazolyl)-benzimidazole 15.6 g. of 3-nitro-4-fluoroaniline is reacted with 15.8 g. of isopropylchloroformate in pyridine following the procedure in Example 96. The product formed is 3-nitro-4-fluoro-N-(isopropoxycarbonyl)aniline.

This product is then heated in an ethanoltriethylamine solution with 0.4 g. of 4-(aminomethyl)thiazole. The reaction is quenched after 15 hours by distilling off the ethanol, causing precipitation of a red solid. This product is employed in the next step.

The product obtained above is added to a suspension of 470 ml. of conc. NaOH in 10 ml. of isopropanol and heated on a steam bath. The solution is filtered after 25 minutes, and the filtrate evaporated to dryness. The residue is dissolved in a minimum amount of water and acidified with acetic acid. The precipitate which results is washed and purified. The product is identified as 6-isopropoxycarbonylamino-1-hydroxy-2-(4' - thiazolyl) - benzimidazoe, M.P. 178–181° C.

Either of the 1,5- or 1,6-compounds prepared following the procedures in Examples 95, 96, or 97 can be employed in the following examples. These examples show the reaction of the 1-hydroxy group to yield the desired 1-substituent. As is obvious, even though the 5- or 6-isopropoxycarbonylamino-2-(4'-thiazolyl)-benzimidazole is employed, any of the compounds prepared infra can be used in the following reaction series. The starting compound in all cases is a

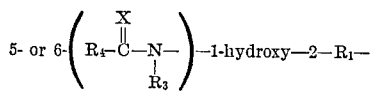

benzimidazole, when $R_3$, $R_4$, and $R_1$ are as defined above.

EXAMPLE 98

5-isopropoxycarbonylamino-2-[2-(4'-thiazoly)benzimidazol-1-yloxy]-ethyl phosphonic acid Mix 2.16 gm. of 5-isopropoxycarbonylamino-1-hydroxy-2-(4'-thiazolyl)benzimidazole in 100 ml. of dry dimethylformamide and treat, portionwise, with 0.44 gm. of 54% sodium hydride. Heat the mixture on a steam bath for 15 minutes. Cool the reaction mixture and add 2.32 gm. of disodium-2-bromoethylphosphonic acid. Stir at room temperature for 16 hours. Pour the reaction mixture into water and extract with methylene chloride. Separate the aqueous layer and evaporate to a small volume. Acidify with dilute hydrochloric acid. Separate the product by filtration to obtain substantially pure 5-isopropoxycarbonylamino-2-[2-(4'-thiazolyl)benzimidazol - 1 - yloxy] - ethyl phosphonic acid.

EXAMPLE 99

Diethyl-6-isopropoxycarbonylamino-2-[2-(4'-thiazolyl)benzimidazol-1-yloxy]-ethyl phosphonate React 2.16 gm. of 6-isopropoxycarbonylamino-1-hydroxy-2-(4'-thiazolyl)benzimidazole, 0.44 gm. of 54% sodium hydride and 2.44 gm. of diethyl-2-bromophosphonate, as in Example 98. Similar work-up will yield diethyl-6-isopropoxycarbonylamino-2-[2 - (4' - thiazolyl) benzimidazol-1-yloxy]-ethyl phosphonate.

EXAMPLE 100

5-isopropoxycarbonylamino-2-(4'-thiazolyl)benzimidazol-1-yloxymethyl methyl sulfide Mix 7.0 gm. of 5-isopropoxycarbonylamino-1-hydroxy-2-(4'-thiazolyl)benzimidazole in 100 ml. of dry dimethylformamide and treat, portion wise, with 1.7 gm. of 54% sodium hydride. Heat the resultant suspension on the steam bath for fifteen minutes. To the cooled reaction mixture add 3.4 gm. of chloromethyl methyl sulfide dissolved in 5 ml. of dimethylformamide and stir at room temperature for 16 hours. Pour onto 1200 ml. of water and extract with chloroform. After washing and drying, evaporate the organic layer vacuo and recrystallize the residue from n-hexane to yield 5-isopropoxycarbonylamino-2-(4'-thiazolyl)benzimidazol-1-yloxymethyl methyl sulfide.

EXAMPLE 101

6-isopropoxycarbonylamino-1-(α-p-methoxyphenacyloxy)-2-(4'-thiazolyl)benzimidazole A suspension of the sodium salt of 6-isopropoxycarbonylamino-1-hydroxy-2-(4' - thiazolyl)benzimidazole is prepared from 0.0025 mole of 6-isopropoxycarbonylamino-1-hydroxy-2-(4'-thiazolyl)benzimidazole and 125 gm. of sodium hydride in 10 ml. of dry dimethylformamide as in Example 98. To the cooled suspension is added 0.641 gm. (.0028 mole) of α-bromo-p-methoxyacetophenone, dissolved in 2 ml. of dry dimethylformamide. The reaction mixture is stirred at room temperature for 2 hours and poured onto 200 gm. of ice water mixture. The solids are collected by filtration, washed with water, and dried in vacuo.

Recrystallization from ethyl acetate yields pure 6-isopropoxycarbonylamino-1-(α - p - methoxy) - 2 - (4' - thiazolyl)benzimidazole.

EXAMPLE 102

5-isopropoxycarbonylamino-1-(α-p-isopropylphenacyloxy)-2-(4'-thiazolyl)benzimidazole React 0.542 gm. of 5-isopropoxycarbonylamino-1-hydroxy-2-(4'-thiazolyl)benzimidazole, 125 gm. of 54% sodium hydride and 0.250 gm. of α-bromo-p-isopropyl acetophenone as in Example 101, to obtain 5-isopropoxycarbonylamino-1-(α-p-isopropylphenacyloxy) - 2 - (4' - thiazolyl)benzimidazole.

EXAMPLE 103

6-isopropoxycarbonylamino-1-[(imidazolin-2-yl)methyleneoxy-2-(4'-thiazolyl)benzimidazole dihydrochloride A solution of the sodium salt of 6-isopropoxycarbonylamino-1-hydroxy-2-(4'-thiazolyl)benzimidazole, prepared as in Example 98, is treated with a dimethylformamide solution of 2-(chloromethyl)-imidazoline. The reaction mixture is heated on the steam bath for 2 hours, cooled and poured onto ice water. The resultant mixture is extracted with chloroform and the extracts are washed with water, dried, and evaporated in vacuo. The residue is dissolved in CHCl₃ and anhydrous hydrogen chloride and yields the crude dihydrochloride salt. Recrystallization from ethanol yields purified 6-isopropoxycarbonylamino-1-[(imidazolin-2-yl)methyleneoxy] - 2 - (4' - thiazolyl) benzimidazole dihydrochloride.

EXAMPLE 104

5 - isopropoxycarbonylamino - 1 - (1,4,5,6 - tetrahydropyrimidin-2-ylmethyleneoxy)-2 - (4' - thiazolyl)benzimidazole dihydrochloride By repeating the process of Example 103 using 5-isopropoxycarbonylamino-1-hydroxy-2 - (4' - thiazolyl)benzimidazole and substituting an equivalent quantity of 2-(bromomethyl) - 1,4,5,6 - tetrahydropyrimidine for the 2-(chloromethyl)imidazoline, 5 - isopropoxycarbonylamino-1-(1,4,5,6-tetrahydropyrimidin - 2 - ylmethyleneoxy) - 2-(4'-thiazolyl)benzimidazole is obtained as the dihydrochloride salt.

EXAMPLE 105

6-isopropoxycarbonylamino-1-[(1-methyl - 1,4,5,6 - tetrahydropyrimidin-2-yl)methyleneoxy]-2-(4' - thiazolyl) benzimidazole dihydrochloride By repeating the process of Example 103 and substituting an equivalent quantity of 2-bromomethyl-1-methyl-1,4,5,6-tetrahydropyrimidine for the 2-(chloromethyl) imidazoline, the product 6-isopropoxycarbonylamino-1-[(1-methyl-1,4,5,6-tetrahydropyrimidin - 2-yl)methyleneoxy]-2-(4'-thiazolyl)benzimidazole is obtained as the dihydrochloride salt.

EXAMPLE 106

5-isopropoxycarbonylamino-1 - [(1-ethyl-2-imidazolin-2-yl)-methyleneoxy]-2 - (4'-thiazolyl)benzimidazole dihydrochloride Repeat the process of Example 104 substituting an equivalent quantity of 2-(chloromethyl)-1-ethylimidazoline to obtain 5-isopropoxycarbonylamine-1-[(1-ethyl-2-imidazolin-2-yl)methyleneoxy] - 2-(4'-thiazolyl)benzimidazole as the dihydrochloride salt.

EXAMPLE 107

Sodium-6-isopropoxycarbonylamino - 2-[2-(4'-thiazolyl)benzimidazolyl-1-yl]oxyethylsulfonate A vigorously stirred suspension of 0.24 mole 6-isopropoxycarbonylamino-1-hydroxy - 2 - (4'-thiazolyl)benzimidazole in 80 ml. of dried dimethylformamide is treated at ambient temperature with 1.2 gm. of a 54% oil dispersion of sodium hydride. The reaction mixture is then heated on steam bath for 15 minutes until evolution of hydrogen has ceased. The cooled reaction mixture is treated with a slurry of 5.78 gm. (.026 mole) of sodium-2-bromomethane sulfonate in 120 ml. of dried dimethylformamide and the resultant suspension is heated on steam bath for 2 hours. 1600 ml. of ethyl ether is added to the cooled reaction mixture. The mixture is stirred until solidification occurs and then solids are collected by filtration and washed with ether. Recrystallization from ethanol-ethyl acetate (50/50 by volume) mixture yields purified sodium-6-isopropoxycarbonylamino-2-[2-(4'-thiazolyl)benzimidazol-1]oxyethylsulfonate dihydrate (M.P. 290° C. dec.).

The free sulfonic acid may be obtained by dissolving 0.4 gm. of the pure sodium salt in 4 ml. of water and acidifying the solution with dilute hydrochloric acid. The free acid, 6 - isopropoxycarbonylamino - 2 - [2-(4'-thiazolyl)benzimidazolyl - 1 - yl]oxyethylsulfonic acid, is separated by filtration and washed with water after drying at 100° in vacuo.

The free acid may be converted to its salts by suspending the free acid in methanol and adding excess base. Dilation of the resultant solution with ether yields the salt of the sulfonic acid.

Inorganic bases such as sodium hydroxide, potassium hydroxide, and lithium hydroxide, as well as organic bases such as diethylamine, ethanolamine, or iminodiethanol may be used.

EXAMPLE 108

5-isopropoxycarbonylamino-1-acetoxy-2-(4'-thiazolyl)benzimidazole

A solution of 1.08 gm. (.005 moles) of 1-hydroxy-2-(4'-thiazolyl)benzimidazole in 10 ml. of pyridine, cooled to 0° C. is treated dispersed with 0.400 gm. (.008 moles) of acetyl chloride. The resultant suspension is allowed to warm to room temperature and stirred for 2 hours. The reaction mixture is poured onto 200 gm. of ice water mixture and aged in the cold. The solids are separated by filtration, washed with water and dried in vacuo. Recrystallization from n-hexane yields pure 5-isopropoxycarbonylamino-1-actoxy-2-(4'-thiazolyl)benzimidazole.

Substitution of the acetyl chloride used above with an equivalent quality of propionyl chloride or n-butyryl chloride yields the propionyloxy or n-butyryloxy analogues.

EXAMPLE 109

3-[2-(4'-thiazolyl)]-6-isopropoxycarbonylaminobenzimidazol-1-yloxy-2-aminopropionate React 2.1 gm. of 6 - isopropoxycarbonylamino - 1 - hydroxy - 2 - (4' - thiazolyl)benzimidazole, 1.7 gm. of 54% sodium hydride and 1.5 gm. of sodium-3-chloro-2-aminopropionate using the process described in Example 107 to obtain 3 - [2 - (4'-thiazolyl)] - 6 - isopropoxycarbonylaminobenzimidazole-1-yloxy-2-aminopropionate.

EXAMPLE 110

5-isopropoxycarbonylamino-2-(4'-thiazolyl)benzimidazol-1-yloxy-α-d-glucoside

Using the same reaction as in Example 100, but substituting an equivalent quantity of 1 - bromo - 2,3,4,6-tetraacetyl - α - d - glucose, one obtains the 1-(2,3,4,6-tetraacetyl - α - d - glucosyl - 1 - oxy) - 2 - (4'-thiazolyl) benzimidazole. The tetraacetyl compound is stirred at room temperature with dilute sodium hydroxide for 16 hours. Acidification of the reaction mixture yields 5-isopropoxycarbonylamino - 2 - (4' - thiazolyl)benzimidazol-1-yloxy-α-α-glucoside.

EXAMPLE 111

6-ethoxycarbonylamino-1-(2-hydroxy)ethoxy-2-(4'-thiazolyl)benzimidazole

Mixing 2.16 gm. of 6 -ethoxycarbonylamino-1-hydroxy-2 - (4' - thiazolyl)benzimidazole, 1.7 gm. of sodium hydride and 5.92 gm. of bromoethanol following the process of Example 100, but allowing reaction time to be shortened to 2 hours and reaction temperature to that of the steam bath, one obtains 6 - ethoxycarbonylamino-1-(2 - hydroxy)ethoxy - 2 - (4' - thiazolyl)benzimidazole, (M.P. 188–189° C.).

EXAMPLE 112

6-ethoxycarbonylamino-1-(2'-cyanomethoxy)-2-(4'-thiazolyl)benzimidazole

By the reaction 2.10 gm. of 6 - ethoxycarbonylamino-1 - hydroxy - 2 - (4' - thiazolyl)benzimidazole, 0.44 gm. of 54% sodium hydride and 0.75 gm. of chloroacetonitrile as in Example 100, one obtains 6-ethoxycarbonylamino-1 - (2' - cyanomethoxy) - 2 - (4' - thiazolyl)benzimidazole, M.P. 195–196° C.

EXAMPLE 113

5- or 6-isopropoxycarbonylamino-1-(β-aminoethoxy)-2-(4'-thiazolyl)benzimidazole

A stirred suspension of 3.92 gm. (0.018 mole) of 5-isopropoxycarbonylamino - 1 - hydroxy - 2 - (4'-thiazolyl) benzimidazole in 60 ml. of dry dimethylformamide is treated at ambient temperature with 0.900 gm. of a 54% oil dispersion of sodium hydride. The resultant suspension is heated on a steam bath for 15 minutes until evolution of hydrogen ceases. The cooled reaction mixture is treated with 5.05 gm. (0.0198) of β-bromo-ethyl phthalimide in 15 ml. of dry dimethylformamide and the resultant solution is heated in the steam for 2 hours. The reaction mixture and the solids separated by filtration. After washing with cold water, the crude phthalimido derivative is dried in vacuo. Recrystallization from ethanol yields pure 5-isopropoxycarbonylamino - 1 - (β - phthalimido-ethoxy-2-(4'-thiazolyl)benzimidazole, (M.P. 211–212° C.). When 6 - isopropoxycarbonylamino - 1 - hydroxy - 2 - (4'-thiazolyl)benzimidazole is employed in the above reaction, the product, 6 - isopropoxycarbonylamino - 1 - hydroxy-2-(4' - thiazolyl)benzimidazole is recovered having a melting point of 188–189° C.

A solution of the crude 5 - substituted phthalamido derivative (2 gm.), dissolved in 100 ml. of 95% ethanol containing 8 drops of water is treated with 0.7 ml. of 95% hydrazine and refluxed for 2 hours. The solvent is evaporated and the residue distributed between chloroform and 5% aqueous sodium hydroxide. The organic layer is separated; dried over magnesium sulfate, and evaporated by vacuo to yield 5-isopropoxycarbonylamino-1 - (β - aminoethoxy) - 2 - (4'-thiazolyl)benzimidazole. The 6 - isopropoxycarbonylamino - 1 - (β-aminoethoxy)-2 - (4' - thiazolyl)benzimidazole is prepared in a similar manner, M.P. 144–146° C.

The amine may be converted to the oxalate salt in the usual manner. Recrystallization from ethanol yields pure 5- or 6 - isopropoxycarbonylamino - 1 - (β - aminoethoxy) - 2 - (4' - thiazolyl)benzimidazole oxalate.

EXAMPLE 114

6-isoproppoxycarbonylamino-1-[1-(6-amino)hexyloxy]-2-(4'-thiazolyl)benzimidazole Using the same procedure as described in Example 113, but substituting 1 - phthalimido - 6 - bromohexane, one obtains 6 - isopropoxycarbonylamino - 1 - [1(6-amino)hexyloxyl]-2-(4' - thiazolyl)benzimidazole as the free base, M.P. 116–118° C. The amine is converted to the hydrochloride by reaction with HCl in ethanol. The dihydrochloride-ethanol solvate has a M.P. of 165° C., dec.

EXAMPLE 115

5-isopropoxycarbonylamino-1-[2-(imidazolin-2-ylamino)ethoxy]-2-(4'-thiazolyl)benzimidazole A solution of 2.6 gm. of 5 - isopropoxycarbonylamino-1 - (β - aminoethoxy) - 2 - (4' - thiazolyl)benzimidazole and 2.44 gm. of 2 - methylthio - 2- imidazolidine hydroiodide in 60 ml. of ethanol is heated at reflux for 16 hours. The solvents are removed in vacuo and the residue is triturated with a small amount of water. The solids are removed by filtration and washed with cold water. Recrystallization of the crude product from ethanol yields 5-isopropoxycarbonylamino - 1 - [2 - (imidazolin - 2-ylamino)ethoxy] - 2 - (4' - thiazolyl)benzimidazole as the hydroiodide salt.

EXAMPLE 116

5-isopropoxycarbonylamino-1-[2-(1-methylimidazolin-2-ylamino)ethoxyl-2-(4'-thiazolyl)benzimidazole From the reaction of 2.6 gm. of 5-isopropoxycarbonylamino - 1 - (β - aminoethoxy) - 2 - (4' - thiazolyl)benzimidazole and 2.5 gm. of 1-methyl-2-methylthio-2-imidazole hydroiodide under the conditions of Example 115, one obtains the 5-isopropoxycarbonylamino-1-[2-(1-methylimidazolin-2-ylamino)ethoxy] - 2 - (4' - thiazolyl) benzimidazole.

EXAMPLE 117

5 - isopropoxycarbonylamino - 1 - [2 - (1,4,5,6-tetrahydropyrimidin - 2 ylamino)ethoxy] - 2 - (4' - thiazolyl) benzimidazole By repeating the process of Example 115 and substituting an equivalent quantity of 2-methylthio-1,4,5,6-tetrahydropyrimidine hydroiodide for the 2-methylthio-2-imidazoline hydroiodide, one obtains 5-isopropoxycarbonylamino - 1 - [2 - (1,4,5,6 - tetrahydropyrimidin-2-ylamino)ethoxy] - 2 - (4' - thiazolyl)benzimidazole as the hydroiodide salt.

EXAMPLE 118

5 - isopropoxycarbonylamino - 1 [2 - (1 - methyl-1,4,5,6-tetrahydropyrimidin - 2 - ylamino)ethoxy] - 2 - (4'-thiazolyl)benzimidazole By using an equivalent quantity of 1-methyl-2-methylthio-1,4,5,6-tetrahydropyrimidine hydroiodide in place of the 2-methylthio-2-imidazoline hydroiodine in Example 115, one obtains 5 - isopropoxycarbonylamino-1-[2-(1-methyl - 1,4,5,6 - tetrahydropyrimidin - 2 - ylamino)ethoxy]-2-(4'-thiazolyl)benzimidazole as the hydroiodide salt.

EXAMPLE 119

5-isopropoxycarbonylamino-1-[1-(2-thiazolin-2-ylamino)ethoxy]-2-(4'-thiazolyl)benzimidazole By repeating the process of Example 115 and substitution an equivalent quantity of 2-methylthio-2-thiazoline hydroiodide for the 2-methylthio-2-imidazolene hydroiodide, one obtains 5-isopropoxycarbonylamino-1-]1 - (2 - thiaolin - 2 - ylaminoethoxy] - 2 - (4' - thiazolyl)benzimidazole as the hydroiodide salt.

EXAMPLE 120

6-isopropoxycarbonylamino-1-[1-(2-guanidino)ethoxyl] 2-(4'-thiazolyl)benzimidazole A solution of 2.6 gms. of 6-isopropoxycarbonylamino-1-(2-aminoethoxy)-2 - (4' - thiazolyl)benzimidazole and 2.78 gms. of 2-methyl-2-thiopseudourea sulfate in 50 ml. of 50% aqueous ethanol, is refluxed for 16 hours. After evaporating the solvent, the residue is taken up in water, made strongly basic with 50% aqueous sodium hydroxide and the mixture is extracted with chloroform. The chloroform layer is separated, dried and a small amount of concentrated nitric acid added. The crude nitrate salt is removed by filtration and washed twice with ether. Recrystallization from ethanol-ether mixture yields 6-isopropoxycarbonylamino - 1 - [2 - (2 - guanidino)ethoxyl]-2-(-thiazolyl)benzimidazole as the NHO₃ salt, M.P. 194–196° C.

EXAMPLE 121

5-methoxycarbonylamino-1-[2-(1-biguanido)ethoxy] 2-(4'-thiazolyl)benzimidazole

Reflux a solution of 2.61 gms. of 5-methoxycarbonylabino - 1 - (2 - aminoethoxy) - 2 - (4'-thiazolyl)benzimidazole and 0.84 gm. of dicyanoamide in 100 ml. of water, containing 12 ml. of concentrated hydrochloric acid for one hour. Evaporate the solvent to a small volume and cool. Filter off 5-methoxycarbonylamino - 1 - [3 - (1-biguanido)ethoxy] - 2 - (4' - thiazolyl)benzimidazole as the hydrochloride salt.

EXAMPLE 122

6-methoxythiocarbonylamino-1-[2-(N-aminoguanidino)ethoxyl]-2-(4'-thiazolyl)benzimidazole Reflux a solution of 6-methoxythiocarbonylamino-1-(2-aminoethoxy)-2-(4'-thiazolyl)benzimidazole, 2.61 gm., and 1.04 gm. of nitroguanidine in 100 ml. of ethanol for 3 hours. Evaporation of the ethanol solvent yields crude 6 - methoxythiocarbonylamino - 1 - [2 - (N - nitroguanidino)ethoxy] - 2 - (4' - thiazolyl)benzimidazole. Dissolve the N-nitroguanidino product in ethanol and reduce with 10% palladium on carbon catalyst until 3 moles of hydrogen are absorbed. Remove the catalyst by filtration and evaporate the reaction mixture in vacuo. Dissolve the residue in ethanol containing an excess of anhydrous hydrogen chloride and dilute with ether to yield 6-methoxythiocarbonylamino - 1 - [2 - (N-aminoquanidino)ethoxy] - 2 - (4' - thiazolyl)benzimidazole as the dihydrochloride salt.

EXAMPLE 123

5-methoxycarbonylamino-1-[2-(1,3-dimethylguanidin-2-yl)ethoxy]-2-(4'-thiazolyl)benzimidazole A solution of 1.3 gm. of 5-methoxycarbonylamino-1-(2-aminoethoxy) - 2 - (4' - thiazolyl)benzimidazole in 100 ml. of methylene chloride is treated with 50 ml. of methylene chloride solution of 0,800 mg. of methyl isothiocyanate. The reaction is stirred for 16 hours at room temperature. The solvents are evaporated to dryness in vacuo and the residue is chromatographed over silica gel. Elution with ethyl acetate yields the purified 5-methoxy-carbonyl amino - 1 - [β - (1 - methylthioureido)ethoxy]-2-(4'-thiazolyl)benzimidazole.

The thiourea is alkylated in refluxing acetone containing 1 mole of methyl iodide. Evaporation of the solvent yields the crude 5-methylisothiouronium hydrochloride salt. The salt is dissolved in ethanol and excess methyl amine is bubbled into the ethanic solution on a steam bath. Evaporation of the ethanol solvent and recrystallization of the residue yields 5-methoxycarbonylamino-1-[2 - (1,3-dimethyl guanidino-2-yl)ethoxy] - 2 - (4' - thiazolyl)benzimidazole as the hydroiodide salt.

EXAMPLE 124

5-methoxycarbonylamino-1-[2-(1-methyl-2-guanidino)ethoxy]-2-(4'-thiazolyl)benzimidazole The process of Example 123 is repeated, except that the 5-methylisothiouronium salt is treated with anhydrous ammonia instead of methylamine to obtain 5-methoxycarbonylamino - 1 - [2 - (1 - methyl - 2 - guanidino)ethoxy]-2-(4'-thiazolyl)benzimidazole.

EXAMPLE 125

5-methoxycarbonylamino-1-[2-(3-amino-1-methyl-2-guanidino)ethoxy]-2-(4'-thiazolyl)benzimidazole The S-isothiouronium salt from Example 123 is refluxed with an equimolar quantity of anhydrous hydrazine in ethanol for 3 hours. The solvent is evaporated and the residue taken in chloroform; hydrogen chloride is bubbled into the mixture. After dilution with ether, dihydrochloride salt of 5-methoxycarbonylamino-1-[2 - (3 - amino - 1-methyl - 2 - guanidino)ethoxy] - 2 - (4' - thiazolyl)benzimidazole is filtered and purified.

EXAMPLE 126

5-methoxycarbonylamino-1-[2-(3-methylamino-1-methyl-2-guanidino)ethoxy]-2-(4'-thiazolyl benzimidazole Repeat the process of Example 125, using an equivalent quantity of 1-methylhydrazine in place of hydrazine, to obtain 5 - methoxycarbonylamino - 1 - [2 - (3 - methylamino - 1 - methyl - 2 - guanidino)ethoxy] - 2 - (4-thiazolyl)benzimidazole.

EXAMPLE 127

5-methoxycarbonylamino - 1 - [2-(3-dimethylamino-1-methyl-2-guanidino)ethoxy] - 2 - (4'-thiazolyl)benzimidazole Repeat the process of Example 125, using an equivalent quantity of 1,1-dimethylhydrazine in place of hydrazine, to obtain 5-methoxycarbonylamino - 1 - [2-(3-dimethylamino-1-methyl-2-guanidino)-ethoxy] - 2 - (4'-thiazolyl)benzimidazole.

EXAMPLE 128

5 - methoxycarbonylamino - 1 - [2-(1,3-dimethyl-1-dimethylamino-2-guanidino)ethoxy] - 2 - (4'-thiazolyl)benzimidazole Repeat the process of Example 125, using an equivalent quantity of 1,1,2-trimethylhydrazine in place of hydrazine, to obtain 5-methoxycarbonylamino-1-[2-(1,3-dimethyl-1-dimethylamino - 2 - guanidino)ethoxy]-2-(4'-thiazolyl)benzimidazole.

EXAMPLE 129

6-ethoxycarbonylamino-1-(2-chloroethoxy)-2-(4'-thiazolyl)benzimidazole

Reflux a solution of 500 mg. of 6-ethoxycarbonylamino-1-(2-hydroxyethoxy)-2-(4'-thiazolyl)benzimidazole from Example 111 and 1 ml. of thionylchloride in 10 ml. of methylene chloride for 1 hour. Evaporate the solvent and recrystallize the residue from ethylacetate to obtain 6-ethoxycarbonylamino - 1 - (2 - chloroethoxy)-2-(4'-thiazolyl)benzimidazole.

Any desired 5 or 6 substituted 1-hydroxyloweralkoxybenzimidazole as prepared according to Example 111 by the reaction of the corresponding 1-hydroxybenzimidazole with a haloloweralkanol, may be chlorinated by the technique described above to obtain the 1-chloroloweralkoxy derivative.

EXAMPLE 130

1-(2-methylaminoethoxy)-2-(4'-thiazolyl)benzimidazole

Heat a solution of 325 mg. of 1-(2-chloroethoxy)-2-(4'-thiazolyl)benzimidazole and 73 mg. of methylamine in 5 ml. of ethanol on a steam bath for 2 hours. Evaporate the solvent and recrystallize the residue from hexane to obtain 1-(2 - methylaminoethoxy)-2-(4'-thiazolyl)benzimidazole.

An equivalent quantity of any desired loweralkylamine may be substituted for the methylamine used above to introduce the corresponding loweralkylamino-loweralkoxy group at the 1-position.

EXAMPLE 131

5-methoxycarbonylamino - 1 - [2 - (1,2-dimethyl-2-guanidino)ethoxy]-2-(4'-thiazolyl)benzimidazole Following the procedure of Example 125, react 5-methoxycarbonylamino - 1 - (2-methylaminoethoxy)-2-(4'-thiazolyl)benzimidazole with methylisothiocyanate to obtain 1-[β-(1,3-dimethylthioureido)ethoxy] - 2 - (4'-thiazolyl)benzimidazole. Alkylate the thiourea with methyliodide to obtain the crude S-methylisothiouronium hydroiodide salt and treat with anhydrous ammonia as in examples and to obtain 5-methoxycarbonylamino-1-[2-(1,2-dimethyl-2-guanidino)-ethoxy] - 2 - (4'-thiazolyl)benzimidazole.

EXAMPLE 132

5-methoxycarbonylamino - 1 - [2 - (1,2,3-trimethyl-2-guanidino)ethoxy]-2-(4'-thiazolyl)benzimidazole Repeat the process of Example 131, using methylamine in place of ammonia, to obtain 5-methoxycarbonylamino-1-[2-(1,2,3 - trimethyl-2-guanidino)ethoxy]-2-(4'-thiazolyl)benzimidazole.

EXAMPLE 133

5-methoxycarbonylamino - 1 - [2-(3-amino-1,2-dimethyl-2-guanidino)ethoxy]-2-(4'-thiazolyl)benzimidazole Following the procedure of Example 125, react the S-methylisothiouronium salt from Example 131 with hydrazine to obtain 5-methoxycarbonylamino-1-[2-(3-amino-1,2-dimethyl-2-guanidino)ethoxy]-2-(4'-thiazolyl)benzimidazole.

EXAMPLE 134

5-methoxycarbonylamino - 1 - [2-(1,2-dimethyl-3-methylamino-2-guanidino)ethoxy] - 2 - (4'-thiazolyl)benzimidazole Following the procedure of Example 125, react the S-methylisothiouronium salt from Example 131 with an equivalent quantity of 1-methylhydrazine in place of hydrazine to obtain 5-methoxycarbonylamino-1-[2-(1,2-dimethyl-3-methylamino-2-guanidino)ethoxy]-2-(4'-thiazolyl)benzimidazole.

EXAMPLE 135

5-methoxycarbonylamino - 1 - [2-(1,2-dimethyl-2-dimethylamino-2-guanidino)ethoxy] - 2 - (4'-thiazolyl)benzimidazole Following the procedure of Examples 125, react the S-methylisothiouronium salt from Example 131 with an equivalent quantity of 1,1-dimethylhydrazine in place of hydrazine to obtain 5-methoxycarbonylamino-1-[2-(1,2-dimethyl-2-dimethylamino-2-guanidino)ethoxy] - 2 - (4'-thiazolyl)benzimidazole.

EXAMPLE 136

5-methoxycarbonylamino - 1 - [2-(1,2,3-trimethyl-1-dimethylamino - 2 - guanidino)ethoxy]-2-(4'-thiazolyl) benzimidazole Following the procedure of Example 125, react the S-methylisothiouronium salt from Example 131 with an equivalent quantity of 1,1-dimethylhydrazine in place of hydrazine to obtain 5-methoxycarbonylamino-1-[2-(1,2-dimethyl-2-dimethylamino - 2 - guanidino)ethoxy]-2-(4'-thiazolyl)benzimidazole.

EXAMPLE 137

5-methoxycarbonylamino - 1 - [2-(1,2,3-trimethyl-1-dimethylamino - 2 - guanidino)ethoxy]-2-(4'-thiazolyl)benzimidazole Following the procedure of Example 123, react 5-methoxycarbonylamino-1-(2-aminoethoxy - 2 - (4'-thiazolyl) benzimidazole with an equivalent quantity of dimethylthiocarbamoyl chloride in place of methylisothiocyanate to obtain 5 - methoxycarbonylamino-1-[β-(3,3-dimethylthioureido)ethoxy]-2-(4' - thiazolyl)benzimidazole. Alkylate the thiourea with methyliodide to obtain the crude S-methylisothiouronium hydroiodine salt and treat with anhydrous ammonia as in Examples 123 and 124 to obtain 5-methoxycarbonylamino - 1 - [2-(1,1-dimethyl-2-guanidino)ethoxy]-2-(4'-thiazolyl)benzimidazole.

EXAMPLE 138

5-methoxycarbonylamino - 1 - [2-(1,1,3-trimethyl-2-guanidino)ethoxy]-2-(4'-thiazolyl)benzimidazole Repeat the process of Example 137, using methylamine in place of ammonia to obtain 5-methoxycarbonylamino-1-[2-(1,1,3 - trimethyl-2-guanidino)ethoxy] - 2 - (4'-thiazolyl)benzimidazole.

EXAMPLE 139

5-methoxyamino-1-[2-(3-amino-1,1-dimethyl-2-guanidino)-ethoxyl]-2-(4'-thiazolyl)benzimidazole Following the procedure of Example 125, react the S-methylisothiouronium salt from Example 137 with hydrazine to obtain 5-methoxycarbonylamino-1-[2-(3-amino - 1,1 - dimethyl - 2 - guanidino)ethoxy] - 2 - (4'-thiazolyl)benzimidazole.

EXAMPLE 140

5-methoxycarbonylamino-1,1-dimethyl-2-guanidino)-ethoxy-2-(4'-thiazolyl)benzimidazole Following the procedure of Example 125, react the S-methylisothiouronium salt from Example 137 with an equivalent quantity of 1-methylhydrazine in place of hydrazine to obtain 5-methoxycarbonylamino-1-[2-(3-methylamino - 1,1 - dimethyl - 2 - guanidino)ethoxy]-2-(4'-thiazolyl)benzimidazole.

EXAMPLE 141

5-methoxycarbonylamino - 1 - [2-(3-dimethylamino-1,1-dimethyl - 2 - guanidino)ethoxy]-2-(4'-thiazolyl)benzimidazole Following the procedure of Example 125, react the S-methylisothiouronium salt from Example 137 with an equivalent quantity of 1,1-dimethylhydrazine in place of hydrazine to obtain 5-methoxycarbonylamino-1-[2-(3-dimethylamino - 1,1 - dimethyl - 2 - guanidino)ethoxy]-2-(4'-thiazolyl)benzimidazole.

EXAMPLE 142

5 - methoxycarbonylamino - 1 - [2 - (1,1,2 - trimethyl - 2-dimethylamino - 3 - guanidino)ethoxy] - 2 - (4' - thiazolyl)benzimidazole Following the procedure of Example 125, react the S-methylisothiouronium salt from Example 137 with an equivalent quantity of 1,1,2-trimethylhydrazine in place of hydrazine to obtain 5-methoxycarbonylamino-1-[2-(1,1,2 - trimethyl - 2 - dimethylamino - 3 - guanidino)-ethoxy]-2-(4'-thiazolyl)benzimidazole.

EXAMPLE 143

6-isopropoxycarbonylamino-1-[2-(N-methyl-N'-formamidino)ethoxy[-2-(4'-thiazolyl)benzimidazole Mix 1.04 gm. of 6-isopropoxycarbonylamino-1-(2-aminoethoxy)-2-(4'-thiazolyl)benzimidazole, 0.888 g. triethylorthoformate and 0.026 gm. of 6-isopropoxycarbonylamino - 1 - (2 - aminoethoxy) - 2 - (4' - thiazolyl)benzimidazole dihydrochloride and heat to reflux with a distillation column attached. Separate the ethanol which is produced by fractional distillation. When the distillation of ethanol is complete, evaporate the excess triethylorthoformate in vacuo. The residue is ethyl-N-[2-(4'-thiazolyl) - 6 - isopropoxycarbonylaminobenzimidazol - 1 - yloxyethyl]formimidate and is used without further purification in the next step.

Dissolve the residue in benzene and while heating on the steam bath, anhydrous methyl amine is bubbled into the reaction mixture. After ½ hour, the solvent is evaporated in vacuo and the residue is chromatographed on silica gel. Elute with varying amounts (from 1% Methanol-99% chloroform to 10% methanol-90% chloroform mixtures) solvent, to obtain purified 6-isopropoxycarbonylamino - 1 - [2-(N - methyl - N' - formamidino)-ethoxy]-2-(4'-thiazolyl)benzimidazole.

EXAMPLE 144

6-isopropoxycarbonylamino-1-[2-(N-methyl-N'-acetamidino)ethoxy]-2-(4'-thiazolyl)benzimidazole By reacting 6-isopropoxycarbonylamino - 1 - (2-aminoethoxy)-2-(4'-thiazolyl)benzimidazole with triethylorthoacetate according to Example 143, one obtains the intermediate ethyl-N-[2 - (4'-thiazolyl)-6-isopropoxycarbonylaminobenzimidazol-1-yloxyethyl]-acetimidate which is reacted with methyl amine as in Example 143 to obtain 6-isopropoxycarbonylamino - 1 - [2 - (N - methyl-N'-acetamidino)ethoxy]-2-(4'-thiazolyl)benzimidazole.

EXAMPLE 145

6 - isopropoxycarbonylamino - 1 - [2 - (N,N' - dimethyl-N - formamidino)ethoxy] - 2 - (4' - thiazolyl)benzimidazole React 6-isopropoxycarbonylamino-1-(2-aminoethoxy)-2-(4'-thiazolyl)benzimidazole with triethylorthoformate as in Example 143, but bubble in dimethylamine instead of methyl amine to obtain 6-isopropoxycarbonylamino-1-[2 - (N,N' - dimethyl - N - formamidino)ethoxy]-2-(4'-thiazolyl)benzimidazole.

EXAMPLE 146

6 - isopropoxycarbonylamino - 1 - [2 - (N,N' - dimethyl-N' - acetamidino)ethoxy] - 2 - (4' - thiazolyl)benzimidazole React 6-isopropoxycarbonylamino-1-(2-aminoethoxy)-2-(4'-thiazolyl)benzimidazole and triethylorthoacetate as in Example 143 and bubble in dimethylamine instead of methyl amine to yield 6-isopropoxycarbonylamino-1-[2-(N,N' - dimethyl - N' - acetamidino)ethoxy] - 2 - (4'-thiazolyl)benzimidazole.

EXAMPLE 147

6-isopropoxycarbonylamino-1-[2-N-formamidino)-ethoxy]-2-(4'-thiazolyl)benzimidazole React 6-isopropoxycarbonylamino-1-(2-aminoethoxy)-2-(4'-thiazolyl)benzimidazole as in Example 143, with triethylorthoformate but bubble in ammonia instead of methyl amine to yield 6-isopropoxycarbonylamino-1-[2-N-formamidino)ethoxy]-2-(4'-thiazolyl)benzimidazole.

EXAMPLE 148

6-isopropoxycarbonylamino-1-[2-(N-acetamidino) ethoxy]-2-(4'-thiazolyl)benzimidazole React 6-isopropoxycarbonylamino-1-(2-aminoethoxy)-2-(4'-thiazolyl)benzimidazole with triethylorthoacetate as in Example 143, but bubble in ammonia instead of methyl amine to yield 6-isopropoxycarbonylamino-1-[2-(N-acetamidino)ethoxy]-2-(4'-thiazolyl)benzimidazole.

EXAMPLE 149

5-isopropoxycarbonylamino-1-[2-(N-acetamidino) ethoxy]-2-(4'-thiazolyl)benzimidazole Dissolve 1.04 gm. of 1-(2-aminoethoxy)-2-(4'-thiazolyl)benzimidazole and 0.500 g., of ethylacetimidate hydrochloride in 20 ml. of ethanol. Stir the reaction mixture at room temperature for 16 hours. Evaporate the solvent and triturate with ether. Separate the product, as the hydrochloride salt by filtration and wash with ether. Suspend the material between chloroform and a water-ice mixture and treat with 50% sodium hydroxide. Separate, dry and evaporate the organic layer to yield 5-isopropoxycarbonylamino-1-[2-(N - acetamidino)ethoxy]-2-(4'-thiazolyl)benzimidazole.

EXAMPLE 150

5-isopropoxycarbonylamino-1-[2-(N-methyl-N-acetamidino)ethoxy]-2-(4'-thiazolyl)benzimidazole React 1.05 gm. of 1-(2-methylaminoethoxy)-2-(4'-thiazolyl)benzimidazole as in Example 149 to yield 5-isopropoxycarbonylamino-1-[2-(N - methyl-N-acetamidino)-ethoxy]-2-(4'-thiazolyl)benzimidazole.

Similarly if 475 mg. of ethyl formimidate hydrochloride is substituted for the ethyl acetimidate hydrochloride the product is 5-isopropoxycarbonylamino-1-[2-(N-methyl-N-formamidino)ethoxy]-2-(4'-thiazolyl)benzimidazole.

EXAMPLE 151

6-ethoxycarbonylamino-1-amidinomethoxy-2-(4'-thiazolyl)benzimidazole

Stir 1.0 gm. of the 6-ethoxycarbonylamino-1-cyanomethoxy-2-(4'-thiazolyl)benzimidazole from Example 112 in 150 ml. ethanolic hydrogen chloride solution at 0° C. for 16 hours. Dilute the reaction mixture with ether and separate the precipitate by filtration to obtain ethyl-6-ethoxycarbonylamino - 2 - (4' - thiazolyl)benzimidazol-1-yloxyacetimidate dihydrochloride.

Without further purification, heat an ethanol solution of the acetimidate obtained above on a steam bath and bubble anhydrous ammonia through the solution for one hour. Evaporate the solvent and recrystallize the residue from ethanol to obtain 6-ethoxycarbonylamino-1-amidinomethoxy-2-(4'-thiazolyl)benzimidazole as the dihydrochloride salt.

EXAMPLE 152

6-ethoxycarbonylamino-1-(N-methylamidinomethoxy)-2-(4'-thiazolyl)benzimidazole

Following the procedure of Example 151, treat ethyl-6-ethoxycarbonylamino - 2 - (4' - thiazolyl)benzimidazol-1-yloxyacetimidate with methyl amine in place of ammonia to obtain 6-ethoxycarbonylamino - 1 - (N-methylamidinomethoxy)-2-(4'-thiazolyl)benzimidazole.

EXAMPLE 153

6-ethoxycarbonylamino-1-(N,N-dimethylamidinomethoxy)-2-(4'-thiazolyl)benzimidazole Following the procedure of Example 151, react ethyl-6-ethoxycarbonylamino-2-(4' - thiazolyl)benzimidazol-1-yloxyacetimidate with dimethylamine in place of ammonia to obtain 6-ethoxycarbonylamino-1-(N,N-dimethylamidinomethoxy)-2-(4'-thiazolyl)benzimidazole.

EXAMPLE 154

5-isopropoxycarbonylamino-1-(N,N'-dimethylamidinomethoxy)-2-(4'-thiazolyl)benzimidazole Reflux an acetone solution of 5-isopropoxycarbonylamino-1-(N - methylamidinomethoxy) - 2-(4'-thiazolyl)benzimidazole with an equimolar quantity of methyl iodide for 12 hours. Evaporate the solvent and recrystallize the residue from ethanol to obtain 5-isopropoxycarbonylamino-1-(N,N' - dimethylamidinomethoxy) - 2-(4'-thiazolyl)benzimidazole as the hydroiodide salt.

EXAMPLE 155

5-isopropoxycarbonylamino-1-(N,N'-trimethylamidinomethoxy)-2-(4'-thiazolyl)benzimidazole Following the procedure of Example 154, react 5-isopropoxycarbonylamino-1 - (N,N' - dimethylamidinomethoxy)-2-(4'-thiazolyl)benzimidazole with methyl iodide to obtain 5-isopropoxycarbonylamino - 1-(N,N,N'-trimethylamidinomethoxy)-2 - (4'-thiazolyl)benzimidazole as the hydroiodide salt.

EXAMPLE 156

5-isopropoxycarbonylamino-1-(N,N'-dimethylamidinomethoxy)-2-(4'-thiazolyl)benzimidazole Following the procedure of Example 154, react 2 molar equivalents of methyl iodide with 5-isopropoxycarbonylamino-1 - amidinomethoxy - 2 - (4'-thiazolyl)benzimidazole. Fractional crystallization yields 5-isopropoxycarbonylamino-1-(N,N' - dimethylamidinomethoxy)-2-(4'-thiazolyl)benzimidazole.

EXAMPLE 157

5-isopropoxycarbonylamino-2-(4'-thiazolyl)benzimidazol-1-yloxymethyl methylsulfone Add 1.32 gm. of 85% metachloroperbenzoic acid to 0.9 gm. of 5-isopropoxycarbonylamino-2-(4'-thiazolyl)benzimidazol-1-yloxymethyl methylsulfide prepared as in Example 100 dissolved in 40 ml. of chloroform at 0° C. Stir the mixture at room temperature overnight. Extract the solution with aqueous sodium bicarbonate and separate the organic layer. Evaporate the solvent in vacuo. Recrystallize the residue from benzene to yield purified 5-isopropoxycarbonylamino - 2 - (4'-thiazolyl)benzimidazol-1-yloxymethyl methylsulfone.

EXAMPLE 158

5-isopropoxycarbonylamino-2-(4'-thiazolyl)benzimidazol-1-yloxymethyl methylsulfoxide To a cooled solution of 4.0 gm. of 5-isopropoxycarbonylamino-2-(4' - thiazolyl)benzimidazol-1-yloxymethyl methylsulfide prepared as in Example 100 in 100 ml. of chloroform, add 2.85 gm. of 85% meta chloroperbenzoic acid. Stir the resultant solution at room temperature for 12 hours. Extract the reaction mixture with aqueous sodium bicarbonate and separate the organic layer. After drying and evaporation of the solvent, recrystallize the residue from ethyl acetate to yield 5-isopropoxycarbonylamino-2-(4'-thiazolyl)benzimidazol-1-yloxymethyl methylsulfoxide.

EXAMPLE 159

6-isopropoxycarbonylamino-2-(4'-thiazolyl)benzimidazol-1-yloxyethyl phosphate

Mix 1 gm. of 6-isopropoxycarbonylamino-2-(4'-thiazolyl)-1-(2-hydroxyethoxy)benzimidazole, 5.5 gm. of phosphoric acid anhydride and 6.85 gm. of orthophosphoric acid. Stir the mixture at room temperature for 24 hours. Flood the reaction mixture with water and separate the precipitate by filtration to provide 6-isopropoxycarbonylamino-2-(4' - thiazolyl)benzimidazol - 1 - yloxyethyl phosphate.

EXAMPLE 160

6-isopropoxycarbonylamino-2-(4'-thiazolyl)benzimidazol-1-yloxyethyl diethylphosphate Dissolve 2.4 gm. of 6-isopropoxycarbonylamino-1-(2-hydroxy)ethoxy-2-(4' - thiazolyl)benzimidazole prepared using the general procedure of Example 111, in 20 ml. of dry pyridine, held at 0° C. Add 1.71 g. of diethylphosphoryl chloride dropwise while maintaining a temperature of 0° to 5° C. After addition is complete, stir at room temperature for 2 hours, dilute with water, extract with chloroform and evaporate the dried chloroform extract. Chromatography of the residue over silica gel and elution with ethyl acetate yields pure 6-isopropoxycarbonylamino - 2 - (4'-thiazolyl)benzimidazol-1-yloxyethyl diethylphosphate.

EXAMPLE 161

5-isopropoxycarbonylamino-1-methoxy-2-(4'-thiazolyl)benzimidazole

This example illustrates an alternate process for preparing the same compound as is described in Example 69.

Mix 0.01 mole of 1-hydroxy-5-isopropoxycarbonylamino-2-(4'-thiazolyl)benzimidazole in 25 ml. of dimethylformamide. Add in small amounts 0.011 mole of sodium hydride. Stir for 15 minutes and then add 0.011 mole of methyl iodide. Stir at room temperature for 20 hours. Pour the reaction mixture into water to precipitate the product. After purification, 5-isopropoxycarbonylamino-1-methoxy-2-(4'-thiazolyl)benzimidazole, M.P. 123–125° C., is identified.

Similarly, use of ethyl iodide or n-propyl iodide yields 5-isopropoxycarbonylamino-1-ethoxy-2-(4'-thiazolyl) benzimidazole, or 5-isopropoxycarbonylamino-1-n-propoxy-2-(4'-thiazolyl)benzimidazole, respectively.

EXAMPLE 162
6-isopropoxycarbonylamino-1-methoxy-2-(4'-thiazolyl)benzimidazole Using the same general reaction described in Example 161, substituting 6-isopropoxycarbonylamino-1-hydroxy-2-(4'-thiazolyl)benzimidazole in the reaction with methyl iodide, the product, 6-isopropoxycarbonylamino-1-methoxy-2-(4'-thiazolyl)benzimidazole, M.P. 171–172° C., is prepared.

EXAMPLE 163
6-methoxycarbonylamino-1-carbomethoxymethoxy-2-(4'-thiazolyl)benzimidazole React 3.48 g. of 1-hydroxy-6-methoxycarbonylamino-2-(4'-thiazolyl)benzimidazole in 30 ml. of dry dimethylformamide in 4.5 g. of a 5% oil dispersion of sodium hydride at room temperature. After stirring for 15 minutes, add 1.68 g. of methylbromoacetate in 5 ml. of dry dimethylformamide. The resultant mixture is heated for 2 hours on a steam bath. After cooling, the mixture is poured into a 300 ml. ice-water mixture. The precipitated product is recovered by filtration. After recrystallization from methanol the product, 6-methoxycarbonylamino-1-carbomethoxymethoxy-2-(4'-thiazolyl)benzimidazole is recovered as the methanol solvate, M.P. 76° C., dec.

EXAMPLE 164
6-methoxycarbonylamino-1-carboxymethoxy-2-(4'-thiazolyl)benzimidazole 7 g. of the product obtained in Example 163, 6-methoxycarbonylamino-1-carbomethoxymethoxy-2-(4'-thiazolyl)benzimidazole, is suspended in 120 ml. of a 5% water-methanol solution. 0.775 g. of NaOH in 5 ml. of water is added. The mixture is heated at reflux for 20 minutes. The solution is cooled and acidified with acetic acid to pH 4. A product precipitates which is filtered and purified. It is identified as 6-methoxycarbonylamino-1-carboxymethoxy-2-(4'-thiazolyl)benzimidazole, M.P. 217–219° C.

In a similar fashion to the two examples above, the following compounds are prepared: 6-isopropoxycarbonylamino-1-carbomethoxymethoxy-2-(4'-thiazolyl)benzimidazole, M.P. 151–153° C.; 6-ethoxycarbonylamino-1-carboxymethoxy-2-(4'-thiazolyl)benzimidazole, M.P. 177–179° C., dec.; 6-ethoxycarbonylamino-1-(α-carboxypropoxy)-2-(4'-thiazolyl)benzimidazole, M.P. 196–198° C.; 6-ethoxycarbonylamino-1-carbomethoxymethoxy-2-(4'-thiazolyl)benzimidazole.

EXAMPLE 165
6-isopropoxycarbonylamino-1-hydroxy-2-(4'-thiazolyl)benzimidazole This example illustrates an alternate process of preparing the compound described in Example 97.

(A) N-(2,4-dinitrophenyl)aminomethyl-4-thiazole.—To a suspension of 268 g. of 1-chloro-2,4-dinitrobenzene in 2400 ml. of absolute ethanol, add a solution of 161 g. of 4-aminomethyl thiazole and 188 ml. of triethylamine dissolved in 750 ml. of absolute ethanol. The mixture is refluxed for 2½ hours, cooled, and the solids filtered. The filter cake is washed and purified, identified as N-(2,4-dinitrophenyl)aminomethyl-4-thiazole, M. P. 146–147° C.

(B) 2-(4'-thiazolyl)-6-nitro-1-hydroxybenzimidazole sodium salt.—Add 103 g. of the product prepared in A to a solution of 10.3 g. of solid NaOH in 2600 ml. of methanol. The suspension is refluxed for 3 hours. The precipitated solids are filtered, washed and used in the next process.

(C) 1-methoxymethoxy-6-nitro-2-(4'-thiazolyl)-benzimidazole.—To a cooled suspension of 228 g. of the product in Step B in 1650 ml. of dry dimethylformamide, 80.5 g. of chloromethyl methylether is added dropwise. The resultant slurry is stirred at room temperature for 3 hours. The mixture is diluted with 1700 ml. of ice-water mixture and aged for 15 minutes. The precipitate is filtered and washed. After drying to constant weight and recrystallization, the product, 1-methoxymethoxy-6-nitro-2-(4'-thiazolyl)benzimidazole, M.P. 170–172° C., is obtained.

(D) 1-methoxymethoxy-6-amino-2-(4'-thiazolyl)-benzimidazole.—A suspension of 252.5 g. of the product prepared in Step C in 50 ml. of absolute ethanol is mixed with 82 g. of 5% ruthenium on carbon, and hydrogenated at 40 p.s.i. with agitation. When no more hydrogen is being used in the reaction, the catalyst is removed by filtration and the solvent evaporated. The dry residue is recrystallized from ethanol to yield 1-methoxymethoxy-6-amino-2-(4'-thiazolyl)benzimidazole, M.P. 144–146° C.

(E) 1-methoxymethoxy-2-(4'-thiazolyl)-6-isopropoxycarbonylamino-benzimidazole.—To a solution of 89.5 g. of the product prepared in Step D in 1000 ml. of dry pyridine cooled to 5° C., 47.6 g. of isopropylchloroformate is added dropwise. After addition, the mixture is allowed to warm to room temperature, stirred for one hour, and poured into an ice-water mixture. After chloroform extraction, the chloroform fraction is evaporated. The residue is purified by chromatography over silica gel. Pure product, 1-methoxymethoxy-2-(4'-thiozolyl)-6-isopropoxycarbonylamino-benzimidazole, M.P. 124–125.5° C., is recovered.

(F) 6-isopropoxycarbonylamino-1-hydroxy-2-(4'-thiazolyl)benzimidazole.—204 g. of the product prepared in Step E and 454 q. of pyridine HCl is heated at 100° C. for 4 hours. The solvent is removed in vacuo and the residue stirred with 4.5 l. of saturated aqueous sodium bicarbonate solution, at room temperature for 15 minutes. The precipitated solid is filtered, washed, and recrystallized from ethanol. The product is recovered as the ethanol solvate, M.P. 154° C., with decomposition at 185° C. The pure product has a M.P. of 178–181° C.

When the 6-methoxycarbonylamino-1-hydroxy-2-(4'-thiazolyl)benzimidazole compound is prepared in an analogous manner, it has a M.P. of 101° C., dec.

The following compounds can also be prepared using procedures outlined above:

1-[2-(2-thiazolinylamino)ethoxy]-2-(4-thiazolyl)-6-isopropoxycarbonylamino-benzimidazole hydroiodide hydrate, M.P. 96° C., dec.;

2-[2-(4-thiazolyl)-5-isopropoxycarbonylamino-benzimidazol-1-yl]-oxyethylsulfonic acid 2,2'-iminodiethanol salt, amorphous solid;

1-[3-(2-imidazolin-2-yl)-propoxyl]-2-(4'-thiazolyl)-6-isopropoxycarbonylamino-benzimidazole, amorphous solid;

1-(N,N-dimethylaminoethoxy)-2-(4'-thiazolyl)-6-isopropoxycarbonylamino-benzimidazole, M.P. 91–93° C.;

1-[N-2-(4'-thiazolyl)-6-isopropoxycarbonylamino-benzimidazol-1-yl-ethoxyformimidoyl]diethylamine, amorphous solid;

1-methylthiomethoxy-2-(4'-thiazolyl)-6-isopropoxycarbonylamino-benzimidazole, amorphous solid;

1-[β-(β-hydroxyethylamino)ethoxy]-2-(4'-thiazolyl)-6-isopropoxycarbonylamino-benzimidazole, M.P. 70° C., dec.;

1-[2-(N-morpholino)ethoxy]-2-(4'-thiazolyl)-6-isopropoxycarbonylamino, M.P. 67–69° C., dec.;

1-[2-(bis-2-hydroxyethyl)aminoethoxy]-2-(4'-thiazolyl)-

6-isopropoxycarbonylamino-benzimidazole, M.P. 129–131° C.;

1-[2-(N-phthalimido)ethoxy]-2-(4'-thiazolyl)-6-isopropoxycarbonylamino-benzimidazole, M.P. 188–189° C.;

1-[2-(guanidino)ethoxy]-2-(4'-thiazolyl)-6-isopropoxycarbonylamino-benzimidazole nitrate, M.P. 190–193° C.;

1-[(2-imidazolin-2-yl)-2-aminoethoxy]-2-(4'-thiazolyl)-6-isopropoxycarbonylamino-benzimidazole hydroiodide, M.P. 213–215° C.;

1-(6-aminohexyloxy)-2-(4'-thiazolyl)-6-isopropoxycarbonylamino-benzimidazole.2HCl.ethanolate, M.P. 165° C., dec.;

2-carboxamidomethoxy-2-(4'-thiazolyl)-6-isopropoxycarbonylamino-benzimidazole, M.P. 155° C., dec.;

1-n-heptanolyloxy-2-(4'-thiazolyl)-6-isopropoxycarbonylamino-benzimidazole, M.P. 83–86° C., dec.;

1-laurolyloxy-2-(4'-thiazolyl)-6-isopropoxycarbonylamino benzimidazole, M.P. 70–73° C.;

1-(β-dimethylaminoethoxy)-2-(4'-thiazolyl)-6-ethoxycarbonylamino benzimidazole, M.P. 69° C., dec. methiodide hemiethanolate;

1-[2-(4'-thiazolyl)-6-ethoxycarbonylamino-benzimidazolyl]-sulfate, M.P. 244–245° C.;

1-acetoxy-2-(4'-thiazolyl)-6-ethoxycarbonylamino-benzimidazole, M.P. 164–167° C.;

1-(β-methylaminoethoxy)-2-(4'-thiazolyl)-6-ethoxycarbonylamino-benzimidazole, M.P. 118–126° C.;

1-(2-aminoethoxy)-2-(4'-thiazolyl)-6-methoxycarbonylamino-benzimidazole dihydrochloride, 190° C., dec.;

1-(2-aminoethoxy)-2-(4'-thiazolyl)-6-isopropoxycarbonylamino-benzimidazole dihydrochloride, 215° C., dec.;

2-[2-(4'-thiazolyl)-6-isopropoxycarbonylamino-benzimidazol-1-yl]oxyethylsulfonic acid, 2,2'-iminodiethanol salt, M.P. 151–157° C.;

1-(2-hydroxyethoxy)-2-(4'-thiazolyl)-6-ethoxycarbonylamino-benzimidazole, M.P. 186–189° C.;

1-dimethylaminoethoxy-2-(4'-thiazolyl)-6-ethoxycarbonylamino-benzimidazole, M.P. 91–96° C.;

1-dimethylaminopropoxy-2-(4'-thiazolyl)-6-ethoxycarbonylamino-benzimidazole, M.P. 121–123° C.;

1-(2-aminoethoxy)-2-(4'-thiazolyl)-6-ethoxycarbonylamino-benzimidazole hydrochloride, M.P. 183–188° C.;

1-hydroxy-2-(4'-thiazolyl)-6-benzamido-benzimidazole, M.P. 260° C., dec.;

Sodium - 2 - [2 - (4'-thiazolyl)-6-ethoxycarbonylamino-benzimidazol-1-yl]ethoxysulfonate, M.P. 273–274° C., dec.;

1-(3-aminopropoxy)-2-(4'-thiazolyl)-6-ethoxycarbonylamino-benzimidazole hydrochloride, M.P. 210–212° C.;

1-methyl-2-(4'-thiazolyl)-6-isopropoxycarbonylamino-benzimidazole, M.P. 215° C.;

1-[(α-carboxy)propoxy]-2-(4'-thiazolyl)-6-ethoxycarbonylamino-benzimidazole, M.P. 196–198° C.;

1-carboxymethoxy-2-(4'-thiazolyl)-6-ethoxycarbonylamino-benzimidazole, M.P. 177–179° C., dec.;

1-carboxymethoxy-2-(4'-thiazolyl)-6-methoxycarbonylamino-benzimidazole, M.P. 217–219° C.; and 1-hydroxy-6-ethoxycarbonylamino-2-(4'-thiazolyl)-benzimidazole, M.P. 140–145° C., dec.

What is claimed is:

1. A compound having the formula:

wherein X represents oxygen or sulfur; and $R_1$ represents a five-membered monocyclic heteroaromatic ring selected from the group consisting of furyl, thienyl, pyrazolyl, imidazolyl, pyrryl, thiazolyl, thiadiazolyl, isothiazolyl and oxazolyl; and $R_2$ represents hydrogen, loweralkyl, benzyl, loweralkanoyl, carbamoyl, N-loweralkylcarbamoyl, loweralkoxycarbonyl, hydroxy, loweralkoxy, loweralkenyloxy, carboxyloweralkoxy and loweralkyl esters thereof, aminoloweralkoxy containing from 2 to 6 carbon atoms in the alkoxy moiety and the N-loweralkyl, N,N-diloweralkyl and triloweralkylammonium halide derivatives thereof, phosphonoloweralkoxy and loweralkyl esters thereof, phosphatoloweralkoxy and loweralkyl esters thereof, loweralkylthioloweralkoxy and the sulfoxide and sulfone derivatives thereof, sulfoloweralkoxy, C-amidinoloweralkoxy and $N_1$- and $N_2$-loweralkyl derivatives thereof, N-amidinoloweralkoxy wherein the amidino moiety is derived from a loweralkanoic acid and the N-loweralkyl derivatives thereof, biguanidoloweralkoxy, guanidinoloweralkoxy and the $N_1$, $N_2$, and $N_3$ loweralkyl derivatives thereof, aminoguanidinoloweralkoxy and the N', $N_1$, $N_2$, and $N_3$ loweralkyl derivatives thereof, imidazolinylaminoloweralkoxy and the 1-loweralkyl derivatives thereof, 1,4,5,6-tetrahydropyrimidinylaminoloweralkoxy and the 1-loweralkyl derivatives thereof, thiazolinylaminoloweralkoxy, thiazinylaminoloweralkoxy, imidazolinoloweralkoxy and the 1-loweralkyl derivatives thereof, 1,4,5,6-tetrahydropyrimidinoloweralkoxy and the 1-loweralkyl derivatives thereof, loweralkanoyloxy, α-aminocarboxyloweralkoxy, glycosyloxy, p-loweralkylphenacyloxy and p-loweralkoxyphenacyloxy; and non-toxic alkali metal, alkaline earth metal and pharmaceutically acceptable amine salts and heavy metal complexes thereof when $R_2$ is carboxyloweralkoxy, sulfoloweralkoxy, phosphonoloweralkoxy, phosphatoloweralkoxy; or α-aminocarboxyloweralkoxy; and salts thereof with pharmaceutically acceptable acids when $R_2$ is aminoloweralkoxy, C-amidinoloweralkoxy, N-amidinoloweralkoxy, biguanidoloweralkoxy, guanidinoloweralkoxy, aminoguanidinoloweralkoxy, imidazolinylaminoloweralkoxy, tetrahydropyrimidinylaminoloweralkoxy, thiazolinylaminoloweralkoxy, thiazinylaminoloweralkoxy, imidazolinoloweralkoxy, tetrahydropyrimidinoloweralkoxy or α-aminocarboxyloweralkoxy; or whenever the $R_2$ group contains a free hydrogen; and $R_3$ represents hydrogen or loweralkyl; and $R_4$ represents hydrogen, loweralkoxy, haloloweralkoxy, loweralkylthio, haloloweralkylthio, cycloloweralkyl, phenyl, halophenyl, aminophenyl, tolyl, naphthyl, phenoxy, halophenoxy, aminophenoxy, tolyoxy, naphthyloxy, phenylthio, halophenylthio, aminophenylthio, tolylthio, naphthylthio, benzyl, halobenzyl, phenethyl, furyl, thiazolyl, thienyl, pyridyl, furyloxy, thiazolyloxy, thienyloxy, pyrazinyloxy, furylthio, thiazolylthio, thienylthio, pyrazinylthio, monoloweralkylamino, diloweralkylamino, piperazino, piperidino, morpholino or pyrrolidino.

2. A compound of claim 1 wherein X is oxygen and $R_2$ is hydrogen.

3. A compound of claim 2 wherein $R_1$ is thiazolyl, $R_3$ is hydrogen and $R_4$ is selected from the group consisting of loweralkoxy, phenyl and p-fluorophenyl.

4. A compound of claim 3 which is 5-loweralkoxycarbonylamino-2-(4'-thiazolyl)benzimidazole.

5. The compound of claim 4 which is 5-methoxycarbonylamino-2-(4'-thiazolyl)benzimidazole.

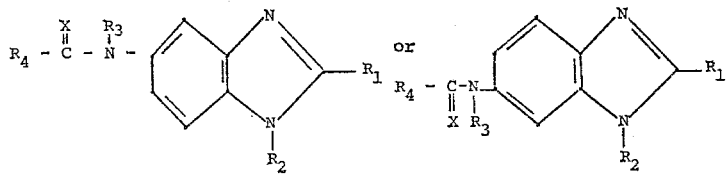

I      II

6. The compound of claim 4 which is 5-ethoxycarbonylamino-2-(4'-thiazolyl)benzimidazole.

7. The compound of claim 4 which is 5-isopropoxycarbonylamino-2-(4'-thiazolyl)benzimidazole.

8. The compound of claim 3 which is 5-benzoylamino-2-(4'-thiazolyl)benzimidazole.

9. The compound of claim 3 which is 5-p-fluorobenzoylamino-2-(4'-thiazolyl)benzimidazole.

10. A compound of claim 1 wherein X is oxygen and $R_2$ is loweralkyl, benzyl, loweralkanoyl, loweralkanoyloxy, loweralkoxycarbonyl, carbamoyl, or N-loweralkylcarbamoyl.

11. A compound of claim 1 wherein X is oxygen and $R_2$ is hydroxy, loweralkoxy, loweralkenyloxy, carboxyloweralkoxy, and loweralkyl esters thereof, aminoloweralkoxy containing from 2 to 6 carbon atoms in the alkoxy moiety and the N-loweralkyl, N,N-diloweralkyl and triloweralkylammonium halide derivatives thereof, phosphonoloweralkoxy and loweralkyl esters thereof, phosphatoloweralkoxy and loweralkyl esters thereof, loweralkylthioloweralkoxy and the sulfoxide and sulfone derivatives thereof, sulfoloweralkoxy, C-amidinoloweralkoxy and $N_1$- and $N_2$-loweralkyl derivatives thereof, N-amidinoloweralkoxy wherein the amidino moiety is derived from a loweralkanoic acid and the N-loweralkyl derivatives thereof, biguanidoloweralkoxy, guanidinoloweralkoxy, and the $N_1$, $N_2$, and $N_3$ loweralkyl derivatives thereof, aminoguanidinoloweralkoxy and the N', $N_1$, $N_2$, and $N_3$ loweralkyl derivatives thereof, imidazolylaminoloweralkoxy and the 1-loweralkyl derivatives thereof, 1,4,5,6-tetrahydropyrimidinylaminoloweralkoxy and the 1-loweralkyl derivatives thereof, thiazolinylaminoloweralkoxy, thiazinylaminoloweralkoxy, imidazolinoloweralkoxy and the 1-loweralkyl derivatives thereof, 1,4,5,6-tetrahydropyrimidinoloweralkoxy and the 1-loweralkyl derivatives thereof, loweralkanoyloxy, α-aminocarboxyloweralkoxy, glycosyloxy, p-loweralkylphenacyloxy and p-loweralkoxyphenacyloxy; and pharmaceutically acceptable salts thereof where the $R_2$ group contains a free hydrogen.

12. A compound of claim 1 wherein X is oxygen and $R_2$ is phosphonoloweralkoxy, phosphatoloweralkoxy, sulfoloweralkoxy, C-amidinoloweralkoxy, N-amidinoloweralkoxy (wherein the amidino moiety is derived from a loweralkanoic acid) biguanidoloweralkoxy, guanidinoloweralkoxy, aminoguanidinoloweralkoxy, imidazolylaminoloweralkoxy; 1,4,5,6-tetrahydropyrimidinylaminoloweralkoxy, thiazolinylaminoloweralkoxy; 1,4,5,6-tetrahydropyrimidinoloweralkoxy, α-aminocarboxyloweralkoxy, and glycosyloxy, and the loweralkyl esters thereof.

13. A compound of claim 1 wherein X is oxygen and $R_2$ is carboxyalkoxy, aminoalkoxy, N-alkylaminoalkoxy, N,N-dialkylaminoalkoxy, diaminoalkoxy, phosphonoloweralkoxy, sulfoloweralkoxy, C-amidinoalkoxy, N-amidinoalkoxy, or guanidinoloweralkoxy.

14. A compound of claim 13 wherein $R_1$ is thiazolyl, $R_3$ is hydrogen, and $R_4$ is selected from loweralkoxy, phenyl, and p-fluorophenyl.

15. A compound of claim 14 which is 5- or 6-loweralkoxycarbonylamino-1-$R_2$-2-(4'-thiazolyl)benzimidazole.

16. The compound of claim 15 which is 5- or 6-isopropoxycarbonylamino - 1-(2'-sulfoethoxy)-2-(4'-thiazolyl)benzimidazole.

17. The compound of claim 15 which is 5- or 6-methoxycarbonylamino-1-guanidinoethoxy - 2 - (4'-thiazolyl)-benzimidazole.

18. The compound of claim 15 which is 5- or 6-ethoxycarbonylamino - 1 - phosphonoethoxy-2-(4'-thiazolyl)-benzimidazole.

References Cited
UNITED STATES PATENTS 3,017,415   1/1962   Sarett et al. _____ 260—304

ALEX MAZEL, Primary Examiner

R. J. GALLAGHER, Assistant Examiner

U.S. Cl. X.R.

424—180, 200, 245, 246, 248, 250, 251, 263, 267, 270, 272, 273

UNITED STATES PATENT OFFICE
CERTIFICATE OF CORRECTION

Patent No. 3,646,049          Dated February 29, 1972

Inventor(s) DALE R. HOFF and MICHAEL H. FISHER

It is certified that error appears in the above-identified patent and that said Letters Patent are hereby corrected as shown below:

In column 1 line 8 delete: ''Ser. No. 631,746''

Insert therefor: ''Ser. No. 613,746''

Signed and sealed this 27th day of August 1974.

(SEAL)
Attest:

McCOY M. GIBSON, JR.
Attesting Officer

C. MARSHALL DANN
Commissioner of Patents